(12) United States Patent
Couleur et al.

(10) Patent No.: US 12,155,304 B2
(45) Date of Patent: Nov. 26, 2024

(54) MULTI-LEVEL POWER CONVERTER WITH LOW-GAIN PHASE-LOCKED LOOP CONTROL

(71) Applicant: Apple Inc., Cupertino, CA (US)

(72) Inventors: Michael Couleur, Rottach-Egern (DE); Nicola Rasera, Munich (DE); Nikola Jovanovic, Munich (DE)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 17/931,088

(22) Filed: Sep. 9, 2022

(65) Prior Publication Data

US 2024/0088787 A1   Mar. 14, 2024

(51) Int. Cl.
*H02M 3/158* (2006.01)
(52) U.S. Cl.
CPC .................................. *H02M 3/158* (2013.01)
(58) Field of Classification Search
CPC ............................................ H02M 3/156–158

USPC ........................................................ 323/271
See application file for complete search history.

(56) References Cited

U.S. PATENT DOCUMENTS

| | | | |
|---|---|---|---|
| 9,705,401 B2 * | 7/2017 | Cho | H02M 3/1582 |
| 9,985,619 B2 * | 5/2018 | Lee | H03K 5/1565 |
| 10,270,339 B2 * | 4/2019 | Lee | H02M 3/158 |
| 11,303,208 B2 * | 4/2022 | Du | G06F 1/28 |
| 2014/0101388 A1 | 4/2014 | McCauley | |
| 2017/0357588 A1 | 12/2017 | Moyer | |
| 2019/0243783 A1 | 8/2019 | Lewis et al. | |

* cited by examiner

*Primary Examiner* — Yemane Mehari
(74) *Attorney, Agent, or Firm* — Kowert, Hood, Munyon, Rankin & Goetzel, P.C.; Dean M. Munyon

(57) ABSTRACT

A multi-level power converter circuit for computer systems maintains phase alignment with other power converter circuits by employing low-gain phase-locked loop circuits. In order to account for different voltage levels on its terminal nodes, the power converter circuit may perform a comparison of the respective voltage levels of its terminal nodes. Using results of the comparison, the power converter circuit can select different regulation modes using different ones of the low-gain phase-locked loop circuits.

20 Claims, 20 Drawing Sheets

Table 1101
$(V_{108}-V_{110})/2 < V_{109}-V_{110}$

|  | Cycle A | Cycle B | Cycle C | Cycle D |
|---|---|---|---|---|
| Closed Switches | 201,202 | 201,203 | 201,202 | 202,204 |

FIG. 11

Table 1201
$(V_{108}-V_{110})/2 > V_{109}-V_{110}$

|  | Cycle A | Cycle B | Cycle C | Cycle D |
|---|---|---|---|---|
| Closed Switches | 203,204 | 201,203 | 203,204 | 202,204 |

FIG. 12

MULTI-LEVEL POWER CONVERTER WITH LOW-GAIN PHASE-LOCKED LOOP CONTROL

BACKGROUND

Technical Field

This disclosure relates to power management in computer systems and, more particularly, to power converter circuit operation.

Description of the Related Art

Modern computer systems may include multiple circuits blocks designed to perform various functions. For example, such circuit blocks may include processors and/or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulated voltage levels on respective power supply signals using a voltage level of an input power supply signal. Such power converter circuits may employ multiple passive circuit elements such as inductors, capacitors, and the like.

BRIEF DESCRIPTION OF THE DRAWINGS

FIG. 11 is a chart depicting a switching sequence for a power converter circuit operating in a particular regulation mode.

FIG. 12 is a chart depicting a switching sequence for a power converter circuit operating in a different regulation mode.

Figure 1:
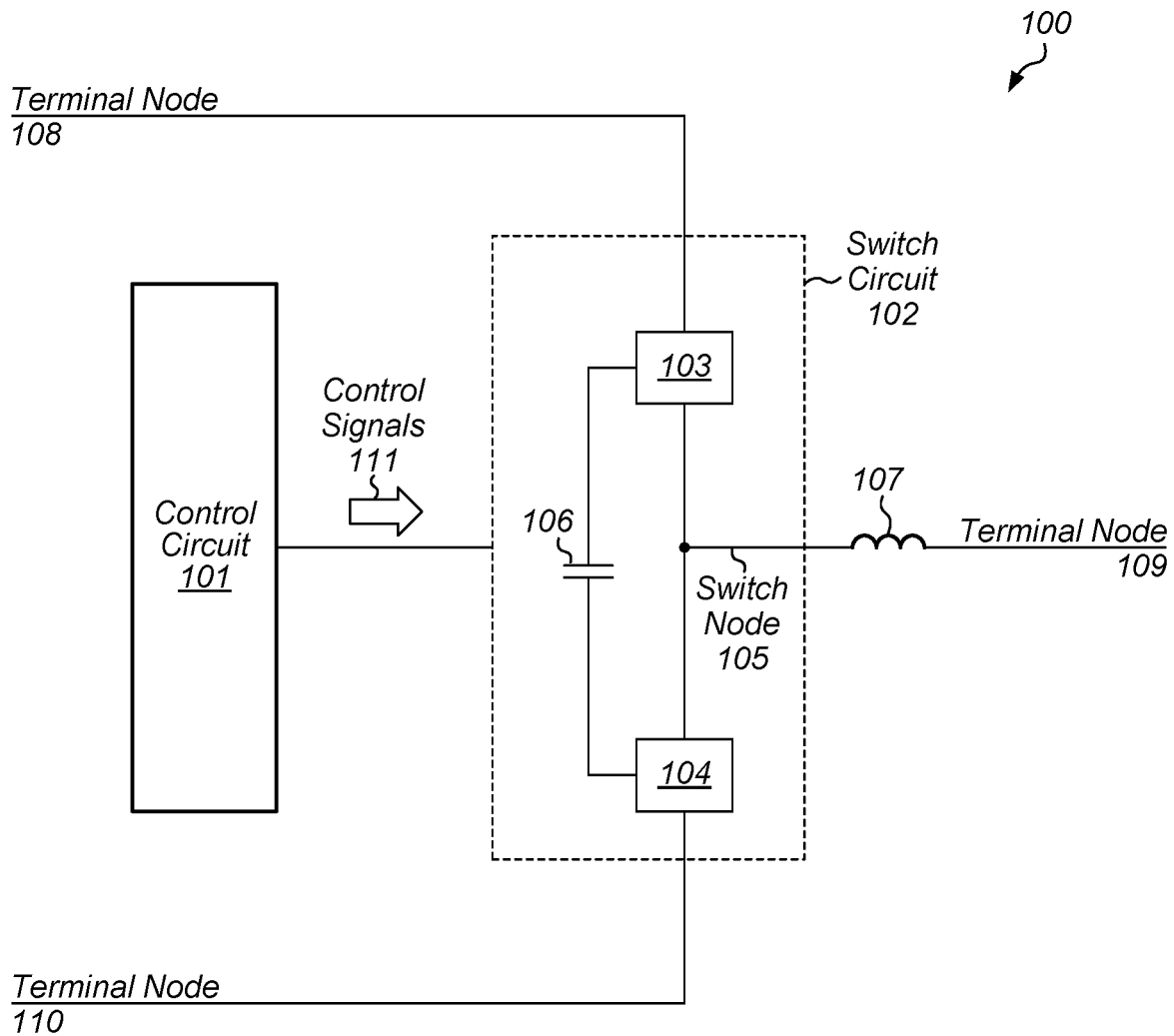
FIG. 1 is a block diagram of an embodiment of a power converter circuit for a computer system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed but, on the contrary, the intention is to cover all modifications, equivalents and alternatives falling within the spirit and scope of the appended claims.

DETAILED DESCRIPTION OF EMBODIMENTS

Computer systems may include multiple circuit blocks configured to perform specific functions. Such circuit blocks may be fabricated on a common substrate and may employ different power supply voltage levels. Power management integrated circuits (referred to as "PMICs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a three-level buck converter circuit. Such converter circuits include multiple devices and a switch node that is coupled to a regulated power supply node via an inductor. For a given switching sequence, the switch node is coupled to a fly capacitor using different sets of the multiple devices included in the converter circuit during different cycles of operation of the voltage regulator circuit. As used and described herein, a switching sequence specifies one or more devices of a voltage regulator circuit are activated during each cycle of a plurality of cycles used during the operation of a voltage regulator circuit.

Three-level buck converters can be operated in different operation modes. In one mode, current flows through the inductor in each cycle of the multiple switching cycles included in a given switching sequence. Such modes are referred to as continuous conduction modes (CCM). Alternatively, in another mode, no current may flow in the inductor in one or more of the cycles. This type of mode is referred to as discontinuous conduction mode (DCM).

During one or more of the cycles in a given switching sequence, energy is applied to the inductor (referred to as "on-time") resulting in an increase in the current flowing through the inductor. During this time, the inductor stores energy in the form of a magnetic field in a process referred to as "magnetizing" the inductor. During other cycles of the given switching sequence, the supply of energy to the inductor is stopped (referred to as "off-time"), which results in the inductor functioning as a current source with the energy stored in the inductor's magnetic field supporting the current flowing into the load. In some cycles, the fly capacitor is charged so that it can be used to supply energy to the inductor in other cycles.

As noted above, a PMIC may include multiple power converter circuits. In such cases, the power converter circuits may share an input power supply node and a ground supply node. Since the input power supply node and ground supply node are shared, switching noise from one power converter circuit can couple into a different power converter circuit that may result in improper operation. To limit the effects of such coupling, the different power converters within a PMIC are operated out of phase with each other.

To provide the phase control for the different power converter circuits included in a PMIC, a clock-based design may be employed where respective out-of-phase clock signals are used to control corresponding power converter circuits. For a given power converter circuit, the clock signal is used to activate or deactivate one or more cycles of the multiple cycles in a particular switching sequence. While the use of out-of-phase clock signals can provide the desired out-of-phase operation, a clock-based control system is fixed to the frequency of the clock signal and cannot adapt to changes in the load current, resulting in undesirable transient performance in some cases.

An alternative to providing out-of-phase operation is the use of an on-time or an off-time based system that employs a phase-locked loop (PLL) circuit to control the duration of either the on-time or off-time of a power converter circuit. Such PLL-based control circuits allow for good transient performance but can be difficult to stabilize and may take many cycles to lock. Low-gain PLL circuits, however, are easier to stabilize and need only a few cycles to lock, allowing clean phase alignment and good load transient performance.

While the use of low-gain PLL circuits can provide the desired phase alignment and transient performance, when used in conjunction with a multi-level power converter additional problems arise. Different sequences of operating the switch devices in a power converter circuit and different regulation modes are better suited for different input and output voltage levels of the power converter circuit. Using a switching sequence and regulation mode not suited for a given combination of input and output voltage levels can result in decreased efficiency of the power converter circuit. The problem can be further exacerbated by power converter circuits configured to operate in different modes (e.g., buck mode, boost mode, inverting buck-boost mode, etc.) since the different modes affect the relationship between input and output voltages.

The embodiments described herein employ a low-gain PLL circuit that can be operated in different regulation modes for use with a multi-level power converter circuit. By determining a switching sequence and regulation mode based on respective voltage levels of the terminals of the multi-level power converter circuit, the power converter circuit can provide phase alignment and the desired transient performance in an efficient manner.

A block diagram depicting an embodiment of a power converter circuit is illustrated in FIG. 1. As illustrated, power converter circuit 100 includes control circuit 101 and switch circuit 102, which includes switches 103, switches 104, capacitor 106, and inductor 107.

Switches 103 are coupled to terminal node 108, capacitor 106, and switch node 105. In a similar fashion, switches 104 are coupled to terminal node 110, capacitor 106, and switch node 105. Inductor 107 is coupled between switch node 105 and terminal node 109. Switch circuit 102 is configured to source, using the respective voltage levels of terminal nodes 108, 109, and 110, a current to inductor 107 during a particular cycle of a given plurality of cycles included in a selected regulation mode.

Control circuit 101 is configured to perform a comparison of the respective voltage levels of terminal nodes 108, 109, and 110. In various embodiments, control circuit 101 is further configured to select, using a result of the comparison, a particular regulation mode from a plurality of regulation modes and a particular switching sequence from a plurality of switching sequences. In various embodiments, the particular switching sequence includes a particular plurality of cycles, and control circuit 101 is further configured to adjust a duration of at least one cycle of the particular plurality of cycles using the respective voltage levels of the plurality of terminal nodes and a reference voltage.

As noted above, a power converter circuit can operate in different modes based on how the terminal nodes of the power converter circuits are used. For example, if terminal node 108 is coupled to an input power supply node while terminal node 110 is coupled to a ground supply node and an output regulated supply voltage is taken from terminal node 109, power converter circuit 100 functions as a traditional buck converter circuit.

Alternatively, if terminal node 109 is coupled to the input power supply node and the output regulated supply voltage is taken from terminal node 108, power converter circuit 100 functions as a boost converter circuit. Power converter circuit 100 can function as an inverting buck-boost converter circuit if terminal node 108 is coupled to the input power supply node, terminal node 109 is coupled to the ground supply node, and the output regulated supply voltage is taken from terminal node 110.

It is noted that, in some embodiments, inductor 107 may be located on a same integrated circuit as control circuit 101 and switch circuit 102 while, in other embodiments, inductor 107 may be located on a different integrated circuit than control circuit 101 and switch circuit 102.

Figure 2:
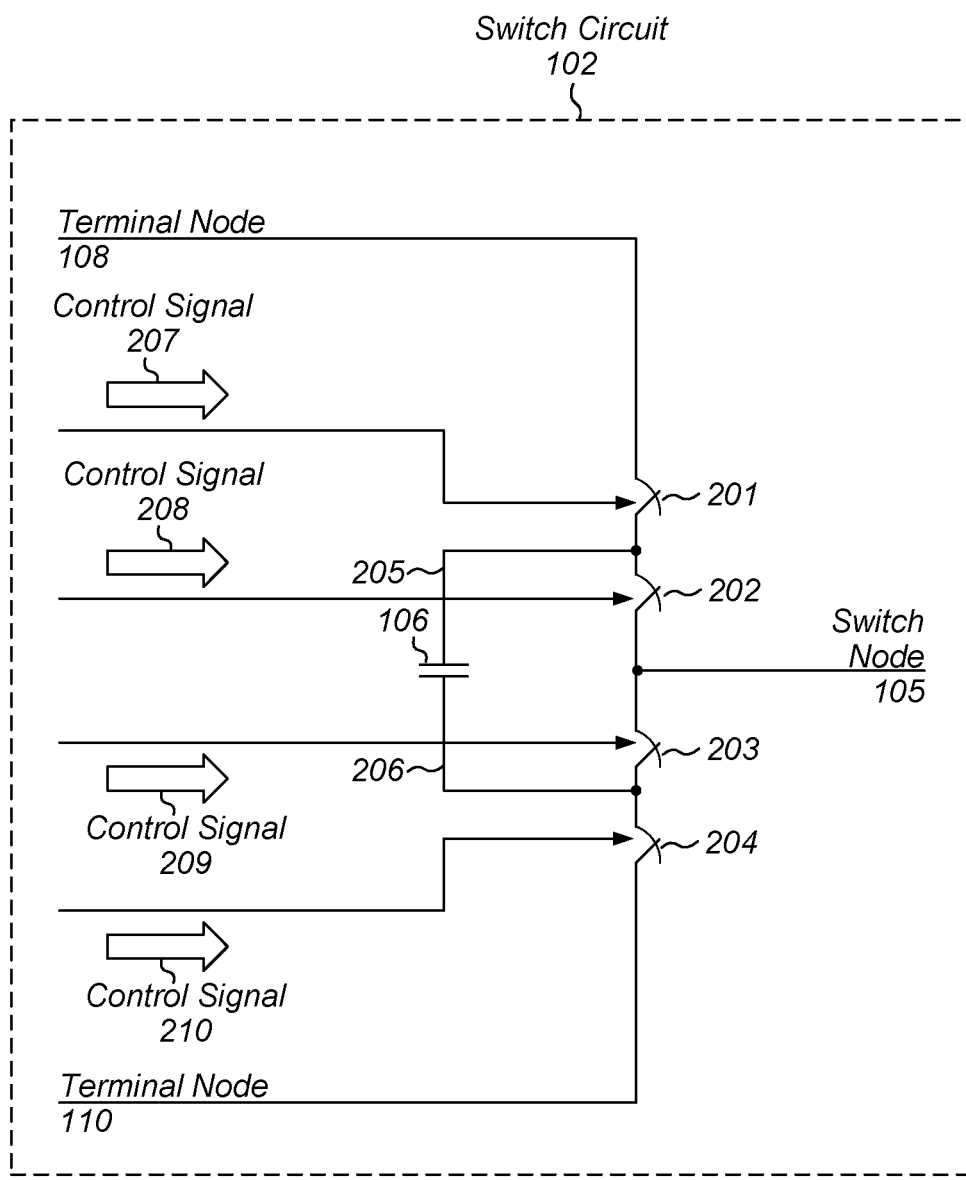
FIG. 2 is a block diagram of an embodiment of a switch circuit included in a power converter circuit.

A block diagram of switch circuit 102 is depicted in FIG. 2. As illustrated, switch circuit 102 includes switches 201-204 and capacitor 106. In various embodiments, switches 201 and 202 may correspond to switch 103, and switches 203 and 204 may correspond to switch 104 as depicted in FIG. 1.

Switch 201 is coupled between terminal node 108 and node 205, and switch 202 is coupled between node 205 and switch node 105. In a similar fashion, switch 203 is coupled between switch node 105 and node 206, and switch 204 is coupled between node 206 and terminal node 110. Switches 201 and 202 are controlled by control signals 207 and 208, respectively, while switches 203 and 204 are controlled by control signals 209 and 210, respectively. In various embodiments, control signals 207-210 may be included in control signals 111.

Capacitor 106 is coupled between node 205 and node 206. In various embodiments, capacitor 106 may be implemented using a metal-oxide-metal (MOM) structure, a metal-insulator-metal (MIM) structure, or any other suitable capacitor structure available on a semiconductor manufacturing process. Capacitor 106 may be located on a common integrated circuit with power converter circuit 100, or on a different integrated circuit, or be a discrete component mounted on a board or other substrate to which an integrated circuit that includes power converter circuit 100 is also mounted.

As described below, different ones of switches 201-204 may be closed at different times to source current to switch node 105, charge capacitor 106, and the like. In some embodiments, the order in which the different ones of switches 201-204 are closed, and the duration of how long the various ones of switches 201-204 remain closed may be based on a selected regulation mode.

In various embodiments, switches 201-204 may be implemented as any suitable combination of n-channel or p-channel metal-oxide semiconductor field-effect transistors (MOSFETs), fin field-effect transistors (FinFETs), gate-all-around field-effect transistors (GAAFETs), or any other suitable transconductance devices.

Figure 3:
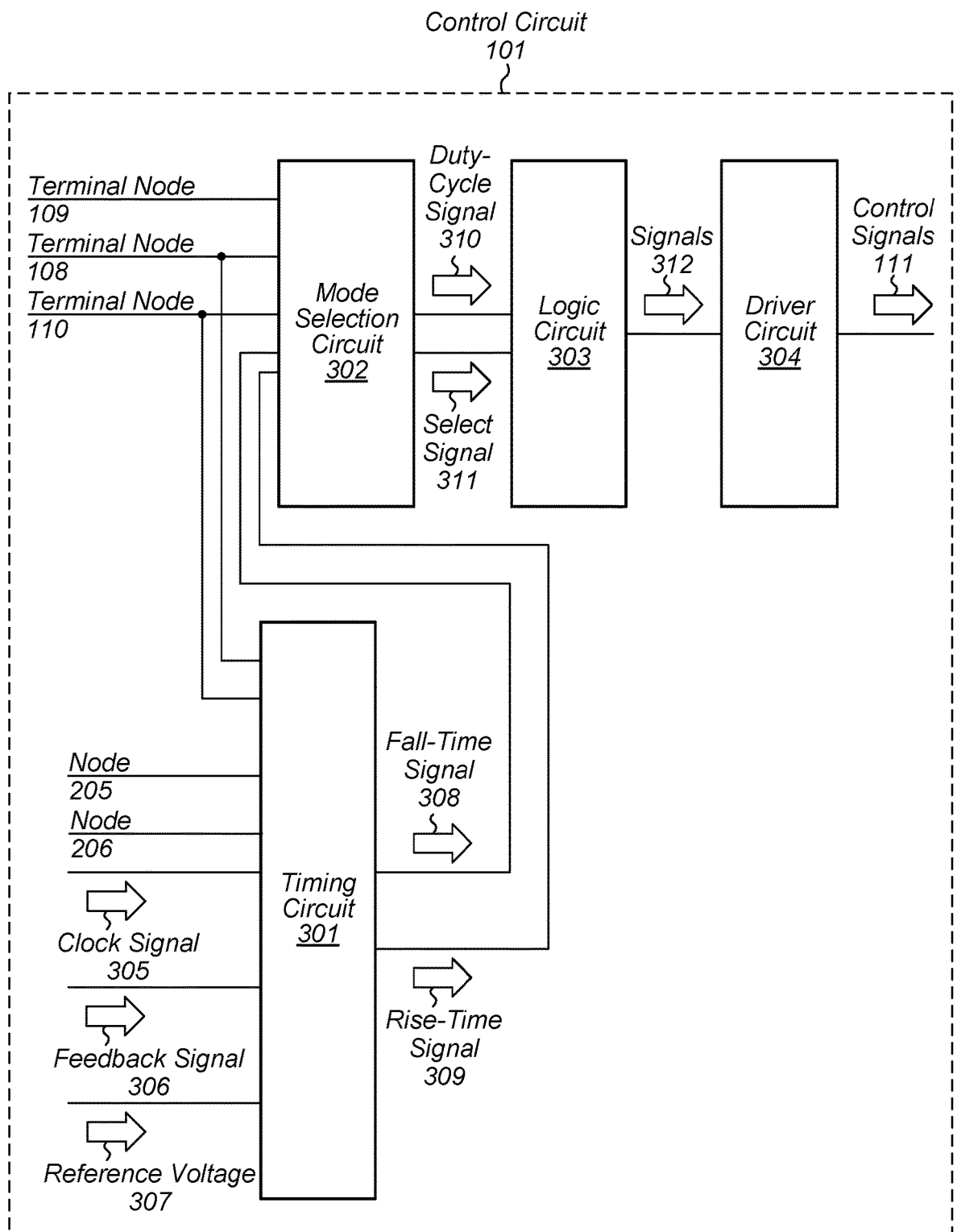
FIG. 3 is a block diagram of an embodiment of a control circuit included in a power converter circuit.

Turning to FIG. 3, a block diagram of an embodiment of control circuit 101 is depicted. As illustrated, control circuit 101 includes timing circuit 301, mode selection circuit 302, logic circuit 303, and driver circuit 304.

Timing circuit 301 is configured to generate fall-time signal 308 and rise-time signal 309 using the respective voltage levels of nodes 205 and 206, the respective voltage levels of terminal nodes 108 and 110, clock signal 305, feedback signal 306, and reference voltage 307. As described below, timing circuit 301 may be configured to sense the current flowing in inductor 107 using the respective voltage levels of terminal nodes 108 and 110, and nodes 205 and 206. Timing circuit 301 may be further configured to perform a comparison of feedback signal 306 to reference voltage 307, and use results of the comparison, along with the sensed inductor current, to generate fall-time signal 308 and rise-time signal 309. It is noted that, in various embodiments, a voltage level of feedback signal 306 may correspond to a voltage level of terminal node 109.

Logic circuit 303 is configured to generate signals 312 using duty-cycle signal 310 and select signal 311. In various embodiments, logic circuit 303 is further configured to activate particular ones of signals 312 in a particular order or sequence based on select signal 311. In some embodiments, logic circuit 303 may be implemented as a state machine or other suitable sequential logic circuit. Alternatively, logic circuit 303 may be implemented as a microcontroller or a general-purpose processor circuit configured to execute software or program instructions.

As used herein, when a signal is activated, it is set to a logic or voltage level that activates a load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

Mode selection circuit 302 is configured to generate duty-cycle signal 310 and select signal 311 using the respective voltages of terminal nodes 109-110, fall-time signal 308 and rise-time signal 309. As described below, mode selection circuit 302 is configured to determine a value for select signal 311 based on the respective voltages of terminals nodes 108-110. Using select signal 311, mode selection circuit 302 is also configured to select one of fall-time signal 308 or rise-time signal 309 to generate duty-cycle signal 310. It is noted that fall-time signal 308 may be selected when power converter circuit 100 is operating in peak-regulation mode, and rise-time signal 309 may be selected when power converter circuit 100 is operating in valley-regulation mode.

In some cases, the capacitive load of the switches in switch circuit 102 can have a negative effect on the rise and fall times of control signals 111. A driver circuit, e.g., driver circuit 304, can be employed to provide sufficient drive strength for control signals 111 to drive the capacitive load of the switches in switch circuit 102. As illustrated, driver circuit 304 is configured to generate control signals 111 using signals 312. In various embodiments, driver circuit 304 may include multiple buffer circuits configured to buffer corresponding ones of signals 312 to provide additional drive. In various embodiments, multiple buffer circuits may be coupled in a serial fashion, with each successive buffer circuit having a higher drive capability than a previous buffer circuit.

Figure 4:
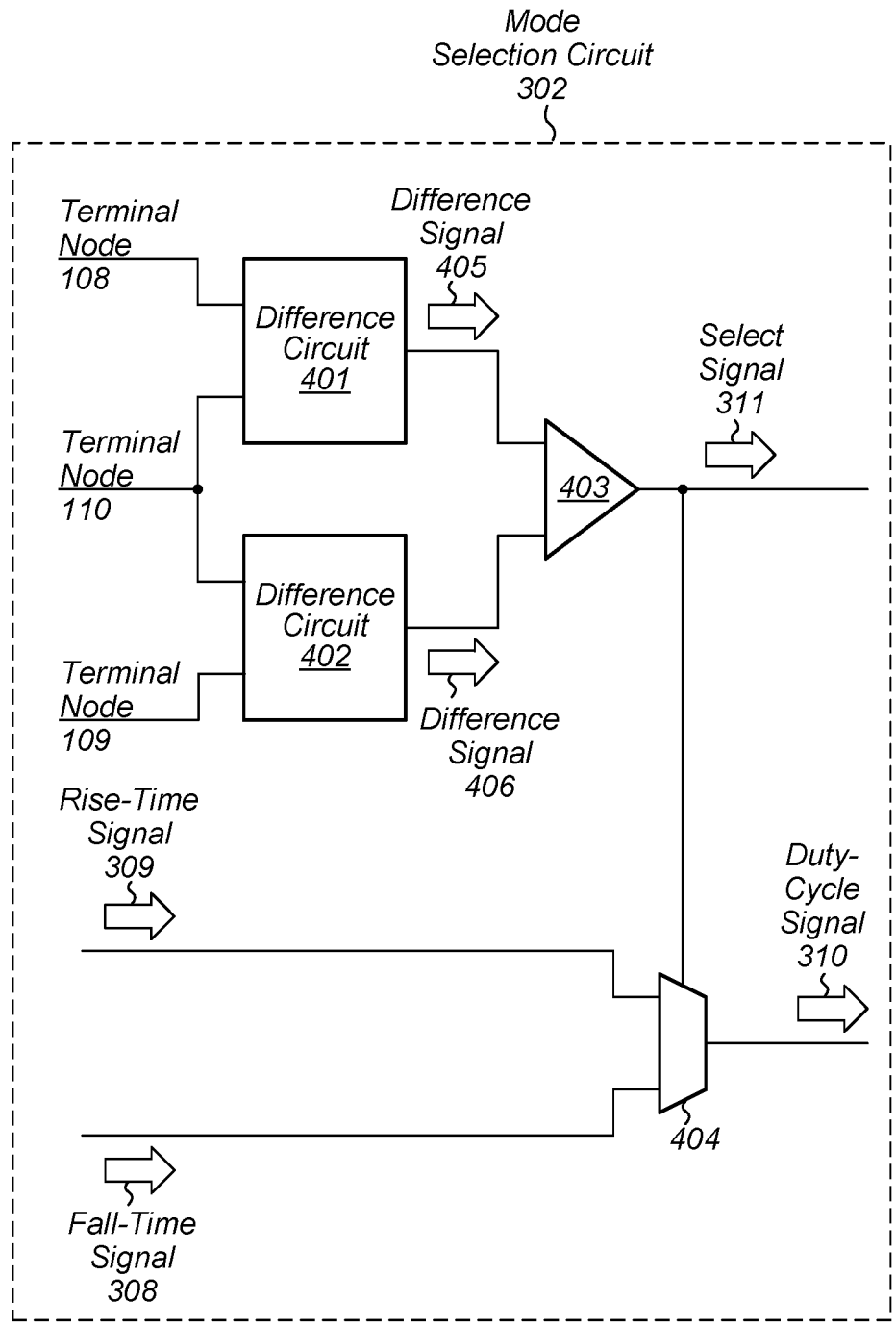
FIG. 4 is a block diagram of an embodiment of a mode selection circuit included in a power converter control circuit.

Turning to FIG. 4, a block diagram of an embodiment of mode selection circuit 302 is depicted. As illustrated, mode selection circuit 302 includes difference circuit 401, difference circuit 402, comparator circuit 403, and multiplex circuit 404.

Difference circuit 401 is configured to generate difference signal 405 using respective voltage levels of terminal node 108 and terminal node 110. In various embodiments, difference circuit 401 may be further configured to generate difference signal 405 such that a binary value of difference signal 405 is based on a comparison of the respective voltage levels of terminal nodes 108 and 110. For example, if a voltage level of terminal node 108 is greater than a voltage level of terminal node 110, then difference signal 405 may be set to a particular binary value. Alternatively, if the voltage level of terminal node 108 is less than the voltage level of terminal node 110, then difference signal 405 may be set to a different binary value.

Difference circuit 402 is configured to generate difference signal 406 using respective voltage levels of terminal node 109 and terminal node 110. In various embodiments, difference circuit 402 may be further configured to generate difference signal 406 such that a binary value of difference signal 406 is based on a comparison of the respective voltage levels of terminal nodes 109 and 110. For example, if a voltage level of terminal node 109 is greater than a voltage level of terminal node 110, then difference signal 406 may be set to a particular binary value. Alternatively, if the voltage level of terminal node 109 is less than the voltage level of terminal node 110, then difference signal 406 may be set to a different binary value.

In various embodiments, difference circuit 401 and difference circuit 402 may be implemented using differential amplifier circuits and converters circuits configured to convert the output of the differential amplifier to a digital value. For example, in some cases, difference circuit 401 and difference circuit 402 may be implemented using a Schmitt trigger circuit or any other suitable comparator circuit.

Comparator circuit 403 is configured to generate select signal 311 using difference signal 405 and difference signal 406. In various embodiments, comparator circuit 403 may be configured to generate select signal 311 based on a comparison of respective values of difference signal 405 and difference signal 406. In various embodiments, comparator circuit 403 may be implemented using any suitable combination of logic gates.

Multiplex circuit 404 is configured to generate duty-cycle signal 310 using rise-time signal 309, fall-time signal 308, and select signal 311. In various embodiments, multiplex circuit 404 is configured to select one of rise-time signal 309 or fall-time signal 308 to use as duty-cycle signal 310 based on a value of select signal 311. In various embodiments, multiplex circuit 404 may be implemented using any suitable combination of logic gates.

Figure 5:
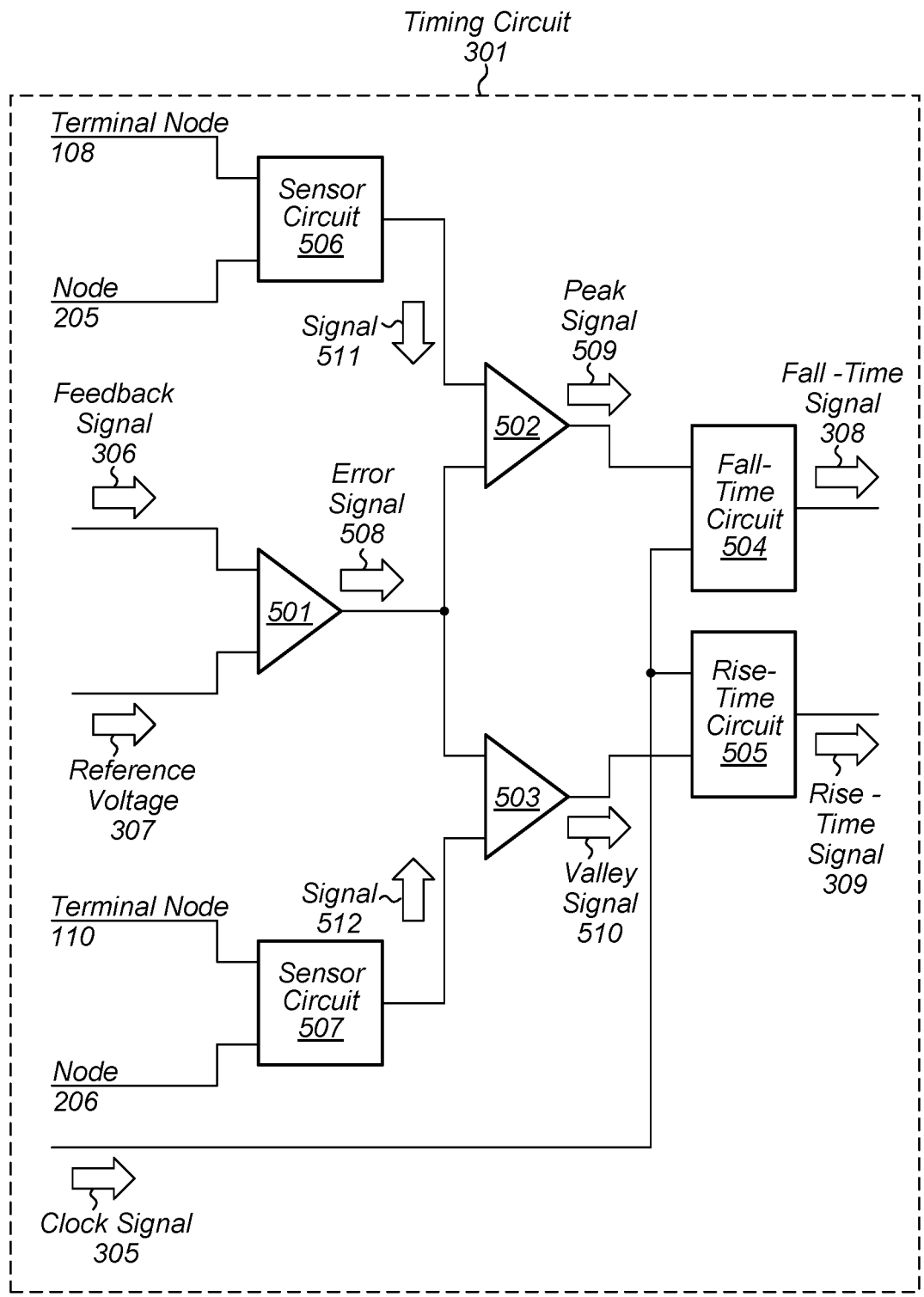
FIG. 5 is a block diagram of an embodiment of a timing circuit included in a power converter control circuit.

Turning to FIG. 5, a block diagram of an embodiment of timing circuit 301 is depicted. As illustrated, timing circuit 301 includes comparator circuits 501-503, fall-time circuit 504, rise-time circuit 505, and sensor circuits 506 and 507.

Sensor circuit 506 is configured to generate signal 511 using respective voltage levels of terminal node 108 and node 205. In various embodiments, signal 511 may correspond to a current flowing into inductor 107 during a charge or magnetize phase within a given selection sequence. Sensor circuit 506 may be implemented using a resistor coupled between terminal node 108 and node 205, and an amplifier circuit configured to amplify a difference between the voltage levels at the terminals of the resistor.

Sensor circuit 507 is configured to generate signal 512 using respective voltage levels of terminal node 110 and node 206. In various embodiments, signal 512 may correspond to a current flowing through inductor 107 during a discharge or de-magnetize phase within a given selection sequence. Sensor circuit 507 may be implemented using a resistor coupled between terminal node 110 and node 206, and an amplifier circuit configured to amplify a difference between the voltage levels at the terminals of the resistor.

Comparator circuit 501 is configured to generate error signal 508 using feedback signal 306 and reference voltage 307. In various embodiments, comparator circuit 501 may be configured to generate error signal 508 such that a magnitude of error signal 508 is proportional to a difference between feedback signal 306 and reference voltage 307. Comparator circuit 501 may, in various embodiments, be implemented as a differential amplifier circuit, a transconductance amplifier, or any suitable amplifier circuit.

Comparator circuit 502 is configured to generate peak signal 509 using signal 511 and error signal 508. In various embodiments, comparator circuit 502 is configured to generate a digital value for peak signal 509 using signal 511 and error signal 508. For example, in various embodiments, comparator circuit 502 may be configured to activate peak signal 509 in response to a determination that signal 511 is greater than error signal 508. Comparator circuit 502 may, in various embodiments, be implemented using a Schmitt trigger circuit or any other suitable type of comparator circuit configured to generate a digital output signal.

Comparator circuit 503 is configured to generate valley signal 510 using signal 512 and error signal 508. In various embodiments, comparator circuit 503 is configured to generate a digital value for valley signal 510 using signal 512 and error signal 508. For example, in various embodiments, comparator circuit 503 may be configured to activate valley signal 510 in response to a determination that signal 512 is less than error signal 508. Comparator circuit 503 may, in various embodiments, be implemented using a Schmitt trigger circuit or any other suitable type of comparator circuit configured to generate a digital output signal.

Fall-time circuit 504 is configured to generate fall-time signal 308 using peak signal 509 and clock signal 305. As described below, fall-time circuit 504 is configured to generate a rising ramp signal in response to an activation of clock signal 305. During this time, inductor 107 is magnetized and when the current in inductor 107 exceeds the value of error signal 508, peak signal 509 is activated, and fall-time circuit 504 generates a falling ramp signal. When the falling ramp signal and rising ramp signal intersect, fall-time circuit 504 is configured to activate fall-time signal 308 to end a de-magnetize phase of inductor 107.

Rise-time circuit 505 is configured to generate rise-time signal 309 using valley signal 510 and clock signal 305. As described below, rise-time circuit 505 is configured to generate falling ramp signal in response to an activation of clock signal 305. During this time, inductor 107 is de-magnetized and when the current in inductor 107 falls below the value of error signal 508, valley signal 510 is activated, and rise-time circuit 505 generates a rising ramp signal. When the falling ramp signal and the rising ramp signal intersect, rise-time circuit 505 is configured to activate rise-time signal 309 to end a magnetize phase of inductor 107.

Although only a single error signal is depicted in the embodiment of FIG. 5, in other embodiments, different error signals may be generated for use in the different regulation modes. Moreover, in some embodiments, sub-circuits within timing circuit 301, e.g., fall-time circuit 504, may be de-activated when a regulation mode is selected that does not require their use.

Figure 6:
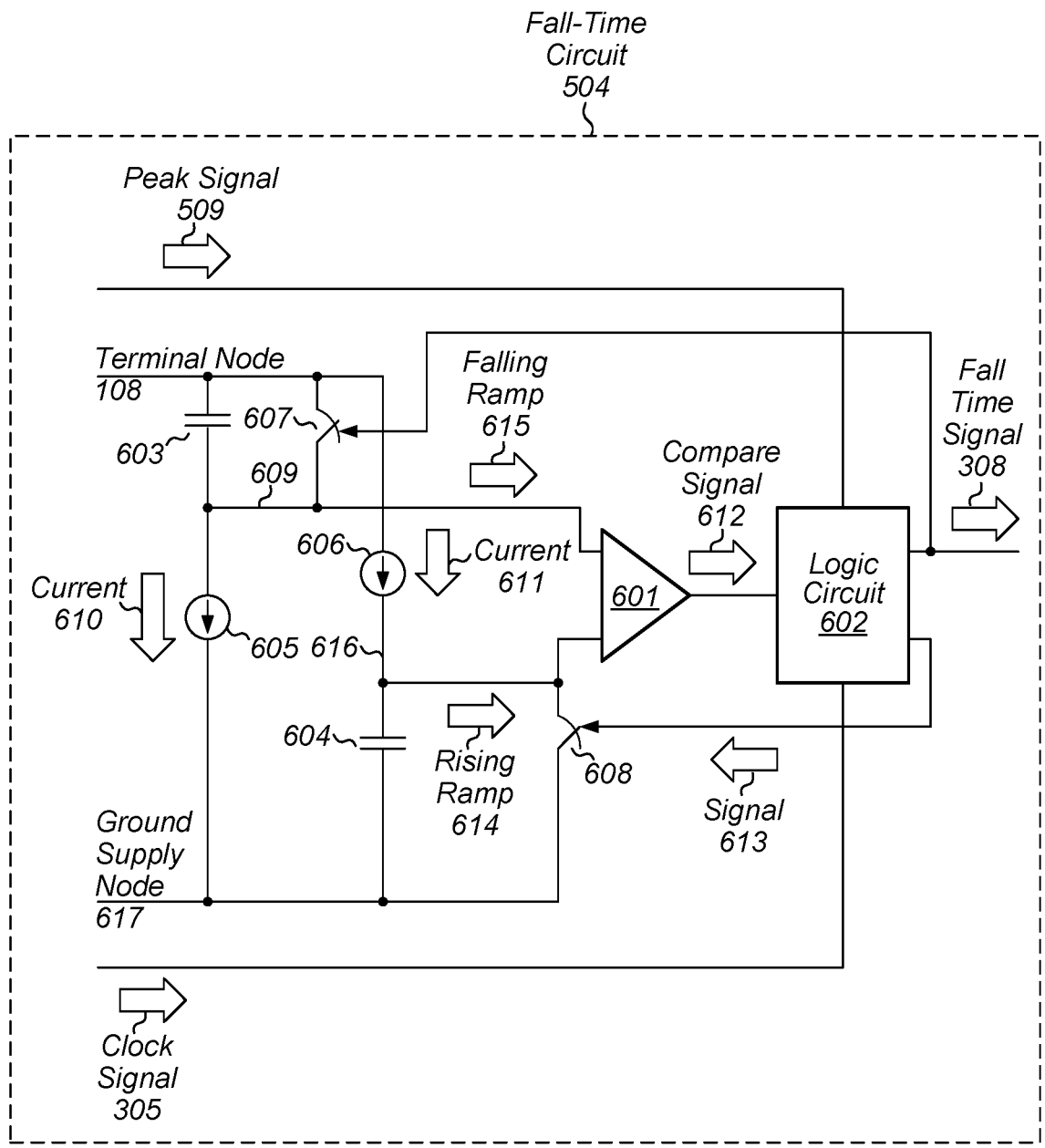
FIG. 6 is a block diagram of an embodiment of a fall-time circuit included in a power converter control circuit.

Turning to FIG. 6, a block diagram of fall-time circuit 504 is depicted. As illustrated, fall-time circuit 504 includes comparator circuit 601, logic circuit 602, capacitor 603, capacitor 604, current source 605, current source 606, switch 607, and switch 608.

Capacitor 603 is coupled between terminal node 108 and node 609. Switch 607 is also coupled between terminal node 108 and node 609, and is controlled by fall-time signal 308. In various embodiments, switch 607 is configured to couple node 609 to terminal node 108 in response to an activation of fall-time signal 308.

Current source 605 is coupled between node 609 and ground supply node 617, and is configured to sink current 610 from node 609. When switch 607 is open, current 610 discharges capacitor 603, generating falling ramp 615, which starts at the voltage level of terminal node 108 and decreases in linear fashion toward ground potential. As described below, a value of current 610 may be proportional to a difference between a voltage level of terminal node 108 and half of a difference between the voltage levels of terminal nodes 108 and 110.

Capacitor 604 is coupled between node 616 and ground supply node 617. Switch 608 is also coupled between node 616 and ground supply node 617, and is controlled by signal 613. In various embodiments, switch 608 is configured to couple node 616 to ground supply node 617 in response to an activation of signal 613.

Current source 606 is coupled between terminal node 108 and node 616, and is configured to source current 611 to node 616. When switch 608 is open, current 611 charges capacitor 604 generating rising ramp 614 which starts at ground potential and increases in a linear fashion towards the voltage of terminal node 108. As described below, a value of current 611 may be proportional to a difference between the respective voltage levels of terminal nodes 108 and 110.

Capacitors 603 and 604 may be implemented using a MOM structure, a MIM structure, or any other suitable capacitor structure available on a semiconductor manufacturing process. Switches 607 and 608 may be implemented using a pass gate circuit, or any suitable combination of MOSFETs, FinFETs, GAAFETs, or any other suitable transconductance devices.

Comparator circuit 601 is configured to generate compare signal 612 using falling ramp 615 and rising ramp 614. In various embodiments, comparator circuit 601 is configured to activate compare signal 612 in response to a determination that a voltage level of falling ramp 615 is the same as a voltage level of rising ramp 614 to within a resolution of comparator circuit 601. Comparator circuit 601 may, in various embodiments, be implemented using a Schmitt trigger circuit, or any other suitable circuit configured to generate a digital output signal based on a comparison of at least two analog signals.

Logic circuit 602 is configured to generate fall-time signal 308 and signal 613 using peak signal 509, clock signal 305, and compare signal 612. In some embodiments, logic circuit 602 is configured to activate signal 613 in response to an activation of clock signal 305. Additionally, logic circuit 602 is configured to activate fall-time signal 308 in response to an activation of peak signal 509. In various embodiments, logic circuit 602 is also configured to deactivate fall-time signal 308 in response to an activation of compare signal 612. Logic circuit 602 may, in various embodiments, be implemented as a state machine or any other suitable sequential logic circuit.

Figure 7:
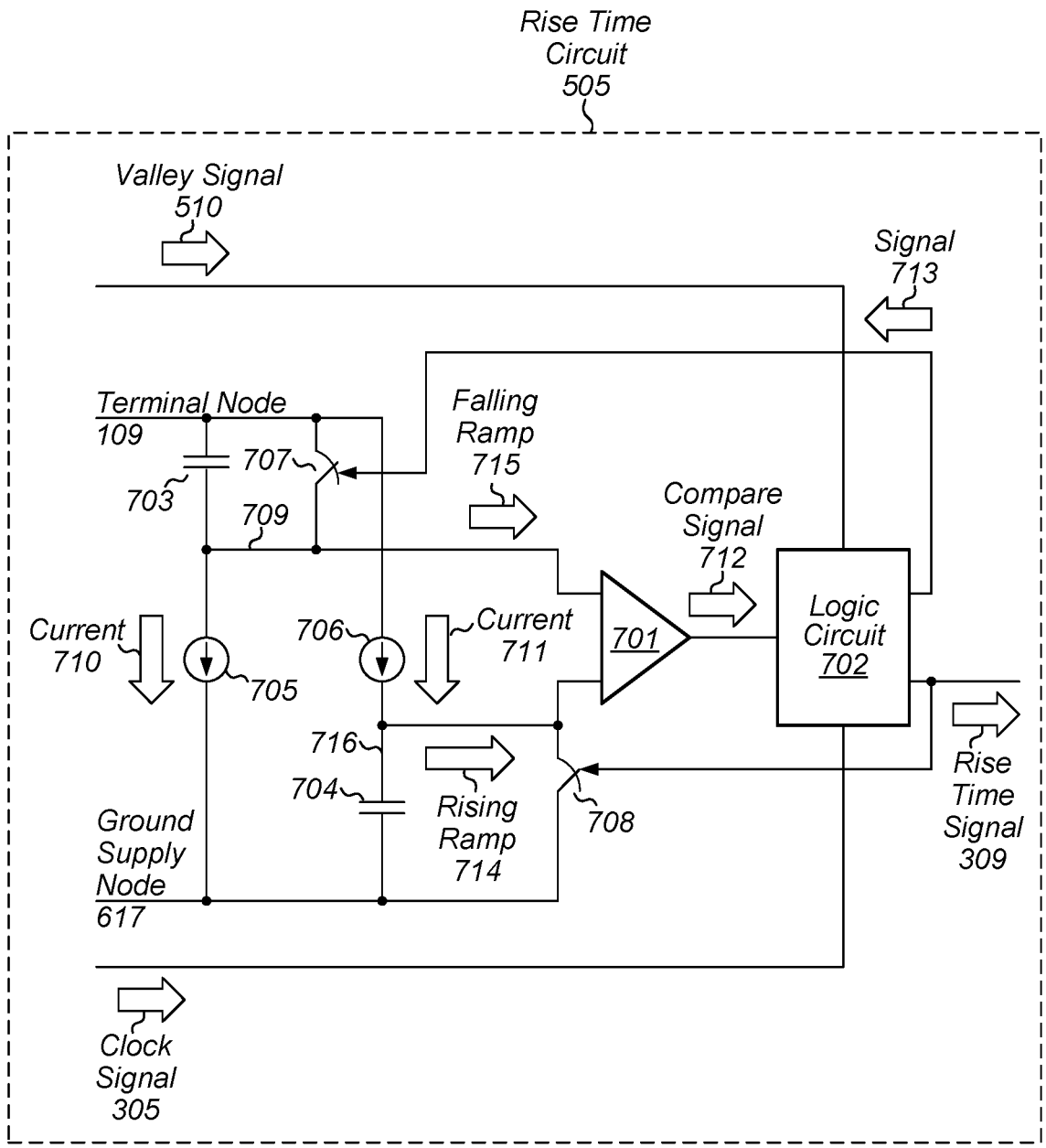
FIG. 7 is a block diagram of an embodiment of a rise-time circuit included in a power converter control circuit.

Turning to FIG. 7, a block diagram of an embodiment of rise-time circuit 505 is depicted. As illustrated, rise-time circuit 505 includes comparator circuit 701, logic circuit 702, capacitors 703 and 704, current sources 705 and 706, and switches 707 and 708.

Capacitor 703 is coupled between terminal node 109 and node 709. Switch 707 is also coupled between terminal node 109 and node 609, and is controlled by signal 713. In various embodiments, switch 707 is configured to couple node 709 to terminal node 109 in response to an activation of signal 713.

Current source 705 is coupled between node 709 and ground supply node 617, and is configured to sink current 710 from node 709. When switch 707 is open, current 710 discharges capacitor 703, generating falling ramp 715, which starts at the voltage level of terminal node 109 and decreases in linear fashion towards ground potential. As described below, a value of current 710 may be proportional to a difference between a voltage level of terminal node 109 and a voltage level of terminal node 110.

Capacitor 704 is coupled between node 716 and ground supply node 617. Switch 708 is also coupled between node 716 and ground supply node 617, and is controlled by rise-time signal 309. In various embodiments, switch 708 is configured to couple node 716 to ground supply node 617 in response to an activation of rise-time signal 309.

Current source 706 is coupled between terminal node 109 and node 716, and is configured to source current 711 to node 716. When switch 708 is open, current 711 charges capacitor 704, generating rising ramp 714, which starts at ground potential and increases in a linear fashion towards the voltage of terminal node 109. As described below, a value of current 711 may be proportional to a difference between the voltage level of terminal node 109 and half the difference of the voltage levels of terminal nodes 108 and 110.

Capacitors 703 and 704 may be implemented using a MOM structure, a MIM structure, or any other suitable capacitor structure available on a semiconductor manufacturing process. Switches 707 and 708 may be implemented using pass gate circuits, or any suitable combination of MOSFETs, FinFETs, GAAFETs, or any other suitable transconductance devices.

Comparator circuit 701 is configured to generate compare signal 712 using falling ramp 715 and rising ramp 714. In various embodiments, comparator circuit 701 is configured to activate compare signal 712 in response to a determination that a voltage level of falling ramp 715 is the same as a voltage level of rising ramp 714 to within a resolution of comparator circuit 701. Comparator circuit 701 may, in various embodiments, be implemented using a Schmitt trigger circuit or any other suitable circuit configured to generate a digital output signal based on a comparison of at least two analog signals.

Logic circuit 702 is configured to generate rise-time signal 309 and signal 713 using valley signal 510, clock signal 305, and compare signal 712. Logic circuit 702 may, in various embodiments, be implemented as a state machine or any other suitable sequential logic circuit.

Figure 8:
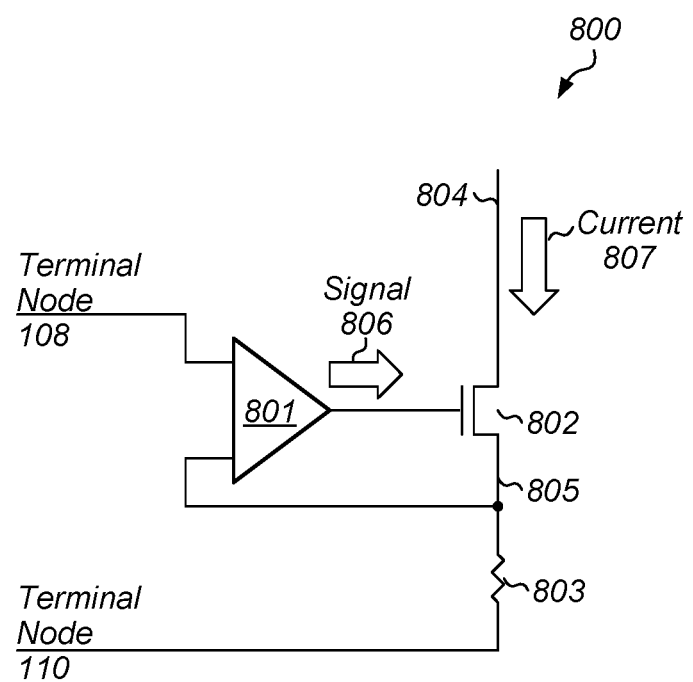
FIG. 8 is a block diagram of an embodiment of a current source circuit.

Turning to FIG. 8, a block diagram of an embodiment of a current source is depicted. As illustrated, current source 800 includes comparator circuit 801, resistor 803, and device 802. In various embodiments, current source 800 may correspond to current source 606 as depicted in FIG. 6.

Comparator circuit 801 is configured to generate signal 806 using a voltage level of terminal node 108 and a voltage level of node 805. In some embodiments, comparator circuit 801 is further configured to generate signal 806 such that a voltage level of signal 806 is proportional to a difference between a voltage level of terminal node 108 and a voltage level of node 805. In various embodiments, comparator circuit 801 may be implemented as a differential amplifier circuit or any other suitable comparator circuit configured to generate an output signal whose voltage is proportional to a difference in the respective voltage levels of two input signals.

Device 802 is coupled between node 804 and node 805, and is controlled by signal 806. Device 802 is configured to adjust the conductance between node 804 and node 805 based on a value of signal 806, allowing current 807 to flow from node 804, through device 802 and resistor 803 into terminal node 110. In various embodiments, device 802 may be implemented using an n-channel MOSFET, FinFET, GAAFET, or any other suitable type of transconductance device. Resistor 803 may, in various embodiments, be implemented using polysilicon, metal, or any other suitable material available in a semiconductor manufacturing process.

Since signal 806 is based on a difference between the voltage of terminal node 108 and the voltage of node 805, the value of current 807, denoted as $I_{807}$, can be expressed as shown in Equation 1, where $V_{108}$ is the voltage of terminal node 108, $V_{110}$ is the voltage of terminal node 110, and $R_{803}$ is the value of resistor 803.

$$I_{807} = \frac{V_{108} - V_{110}}{R_{803}} \quad (1)$$

Figure 9:
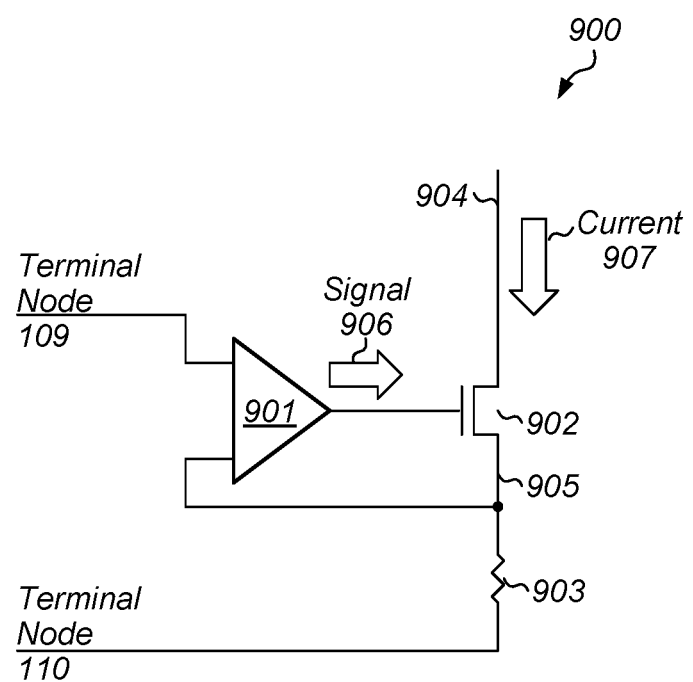
FIG. 9 is a block diagram of a different embodiment of a current source circuit.

Turning to FIG. 9, block diagram of an embodiment of a current source is depicted. As illustrated, current source 900 includes comparator circuit 901, resistor 903, and device 902. In various embodiments, current source 900 may correspond to current source 705 as depicted in FIG. 7.

Comparator circuit 901 is configured to generate signal 906 using a voltage level of terminal node 109 and a voltage level of node 905. In some embodiments, comparator circuit 901 is further configured to generate signal 906 such that a voltage level of signal 906 is proportional to a difference between a voltage level of terminal node 109 and a voltage level of node 905. In various embodiments, comparator circuit 901 may be implemented as a differential amplifier circuit or any other suitable comparator circuit configured to generate an output signal whose voltage is proportional to a difference in the respective voltage levels of two input signals.

Device 902 is coupled between node 904 and node 905, and is controlled by signal 906. Resistor 903 is coupled between node 905 and terminal node 110. Device 902 is configured to adjust the conductance between node 904 and node 905 based on a value of signal 906, allowing current 907 to flow from node 904, through device 902 and resistor 903 into terminal node 110. In various embodiments, device 902 may be implemented using an n-channel MOSFET, FinFET, GAAFET, or any other suitable type of transconductance device. Resistor 903 may, in various embodiments, be implemented using polysilicon, metal, or any other suitable material available in a semiconductor manufacturing process.

Since signal 906 is based on a difference between the voltage of terminal node 109 and the voltage of node 905, the value of current 907, denoted as $I_{907}$, can be expressed as shown in Equation 2, where $V_{109}$ is the voltage of terminal node 109, $V_{110}$ is the voltage of terminal node 110, and $R_{903}$ is the value of resistor 903.

$$I_{907} = \frac{V_{109} - V_{110}}{R_{903}} \quad (2)$$

Figure 10:
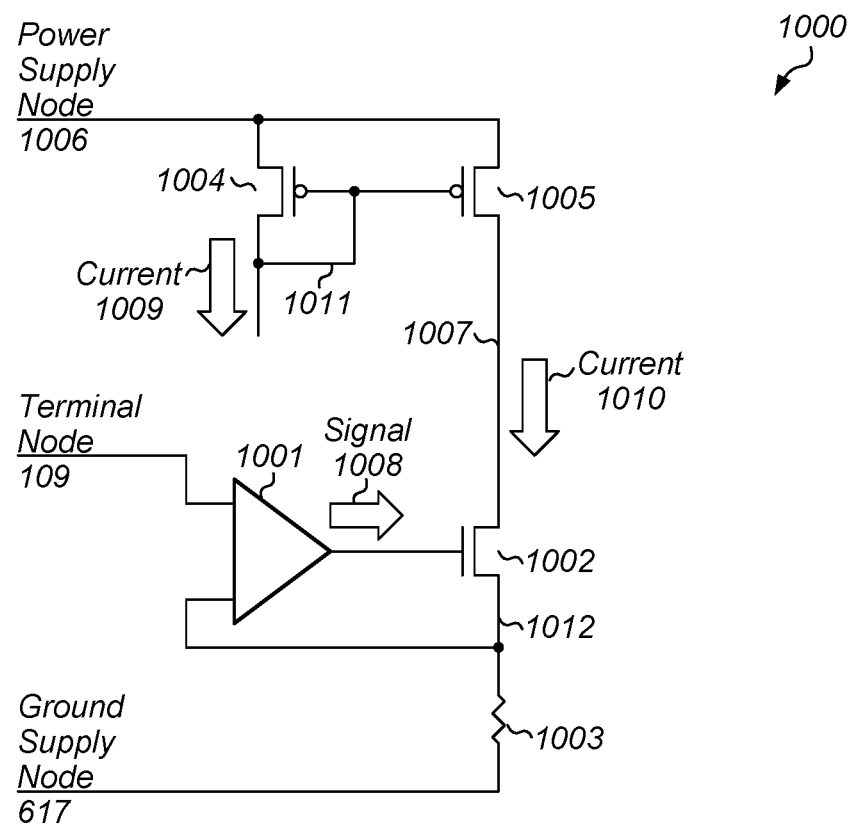
FIG. 10 is a block diagram of another embodiment of a current source circuit.

Turning to FIG. 10, a block diagram of another embodiment of a current source is depicted. As illustrated, current source 1000 includes comparator circuit 1001, devices 1002, 1004, and 1005, and resistor 1003. In various embodiments, current source 1000 may correspond to current sources 605 and 706 as depicted in FIG. 6 and FIG. 7, respectively.

Device 1004 is coupled between power supply node 1006 and node 1011, and is controlled by a voltage level on node 1011. In a similar fashion, device 1005 is coupled between power supply node 1006 and node 1007, and is controlled by the voltage level of node 1011. In various embodiments, devices 1004 and 1005 are configured to operate as current mirror circuit that replicates current 1009 flowing through device 1004, to a current of similar value flowing in device 1005. Devices 1004 and 1005 may, in various embodiments, be implemented as p-channel MOSFETs, FinFET, GAAFETs, or any other suitable type of transconductance devices.

Comparator circuit 1001 is configured to generate signal 1008 using a voltage level of terminal node 109 and a voltage level of node 1012. In some embodiments, comparator circuit 1001 is further configured to generate signal 1008 such that a voltage level of signal 1008 is proportional to a difference between a voltage level of terminal node 109 and a voltage level of node 1012. In various embodiments, comparator circuit 1001 may be implemented as a differential amplifier circuit or any other suitable comparator circuit configured to generate an output signal whose voltage is proportional to a difference in the respective voltage levels of two input signals.

Device 1002 is coupled between node 1007 and node 1012, and is controlled by signal 1008. Resistor 1003 is coupled between node 1012 and ground supply node 617. Device 1002 is configured to adjust the conductance between node 1007 and node 1012 based on a value of signal 1008, allowing current 1010 to flow from node 1007, through device 1002 and resistor 1003 into ground supply node 617. In various embodiments, device 1002 may be implemented using an n-channel MOSFET, FinFET, GAAFET, or any other suitable type of transconductance device. Resistor 1003 may, in various embodiments, be implemented using polysilicon, metal, or any other suitable material available in a semiconductor manufacturing process.

Since signal 1008 is based on a difference between the voltage of terminal node 109 and the voltage of node 1012, the value of current 1010 is a function of the voltage level of terminal node 109. Current 1010 also includes a component from the current mirror circuit formed by devices 1004 and 1005. In cases where current 1009 is equal to $$\frac{(V_{108} - V_{110})}{2},$$

current 1010, denoted as $I_{1010}$, can be expressed as shown in Equation 3, where $V_{108}$ is the voltage of terminal node 108, $V_{110}$ is the voltage of terminal node 110, $V_{109}$ is the voltage of terminal node 109, and $R_{1003}$ is the value of resistor 1003.

$$I_{1010} = \frac{1}{R_{1003}} \left( \frac{V_{108} - V_{110}}{2} - V_{109} \right) \quad (3)$$

Turning to FIG. 11, a table illustrating a switching sequence for a power converter circuit (e.g., power converter circuit 100) is depicted. Table 1101 lists which switches in a switch circuit included in the power converter circuit are closed for each of the four cycles included in the switching sequence for the first terminal node voltage condition as described above.

During cycle A, switches 201 and 202 are closed while switches 203 and 204 are open. By closing switches 201 and 202, switch node 105 is coupled to terminal node 108, magnetizing inductor 107. It is noted that in cycle A, capacitor 106 is floating. Cycle A is initiated when clock signal 305 is activated, and ends when a current through inductor 107 reaches a peak threshold value.

Cycle B is initiated when cycle A ends. During cycle B, switches 201 and 203 are closed, while switches 202 and 204 are open. With switches 201 and 203 closed, inductor 107 is coupled in series with capacitor 106 between terminal nodes 108 and 109, de-magnetizing inductor 107 by allowing current to flow into capacitor 106. Cycle B ends when rising ramp 614 intersects falling ramp 615.

During cycle C, switches 201 and 202 are again closed while switches 203 and 204 are open. As with cycle A, closing switches 201 and 202 couples switch node 105 to terminal node 108, magnetizing inductor 107. Cycle C is initiated when clock signal 305 is activated, and ends when current through inductor 107 reaches a peak threshold value.

At the conclusion of cycle C, cycle D begins. During cycle D, switches 202 and 204 are closed, while switches 201 and 203 are open. With switches 202 and 204 closed, inductor 107 is coupled in series with capacitor 106 between terminal nodes 109 and 110, de-magnetizing inductor 107 by allowing current to flow into capacitor 106. Cycle D ends when rising ramp 614 intersects falling ramp 615. At the conclusion of cycle D, the four-cycle operation begins again until the power converter switches regulation mode or is powered off.

Turning to FIG. 12, a table illustrating a switching sequence for a power converter circuit (e.g., power converter circuit 100) is depicted. Table 1201 lists which switches in a switch circuit included in the power converter circuit are closed for each of the four cycles included in the switching sequence for a second terminal node voltage condition as described above.

During cycle A, switches 203 and 204 are closed while switches 201 and 202 are open. By closing switches 203 and 204, switch node 105 is coupled to terminal node 110, de-magnetizing inductor 107. It is noted that in cycle A, capacitor 106 is floating. Cycle A is initiated when clock signal 305 is activated, and ends when current through inductor 107 reaches a valley threshold value.

Cycle B is initiated when cycle A ends. During cycle B, switches 201 and 203 are closed, while switches 202 and 204 are open. With switches 201 and 203 closed, inductor 107 is coupled in series with capacitor 106 between terminal nodes 108 and 109, magnetizing inductor 107 with current drawn from capacitor 106. Cycle B ends when rising ramp 714 intersects falling ramp 715.

During cycle C, switches 203 and 204 are again closed while switches 201 and 202 are open. As with cycle A, closing switches 203 and 204, couples switch node 105 to terminal node 110, de-magnetizing inductor 107. Cycle C is initiated when clock signal 305 is activated, and ends when current through inductor 107 reaches the valley threshold value.

At the conclusion of cycle C, cycle D begins. During cycle D, switches 202 and 204 are closed, while switches 201 and 203 are open. With switches 202 and 204 closed, inductor 107 is coupled in series with capacitor 106 between terminal nodes 109 and 110, magnetizing inductor 107 with current drawn from capacitor 106. Cycle D ends when rising ramp 714 intersects falling ramp 715. At the conclusion of cycle D, the four-cycle operation begins again until the power converter switches regulation mode or is powered off.

Figure 13:
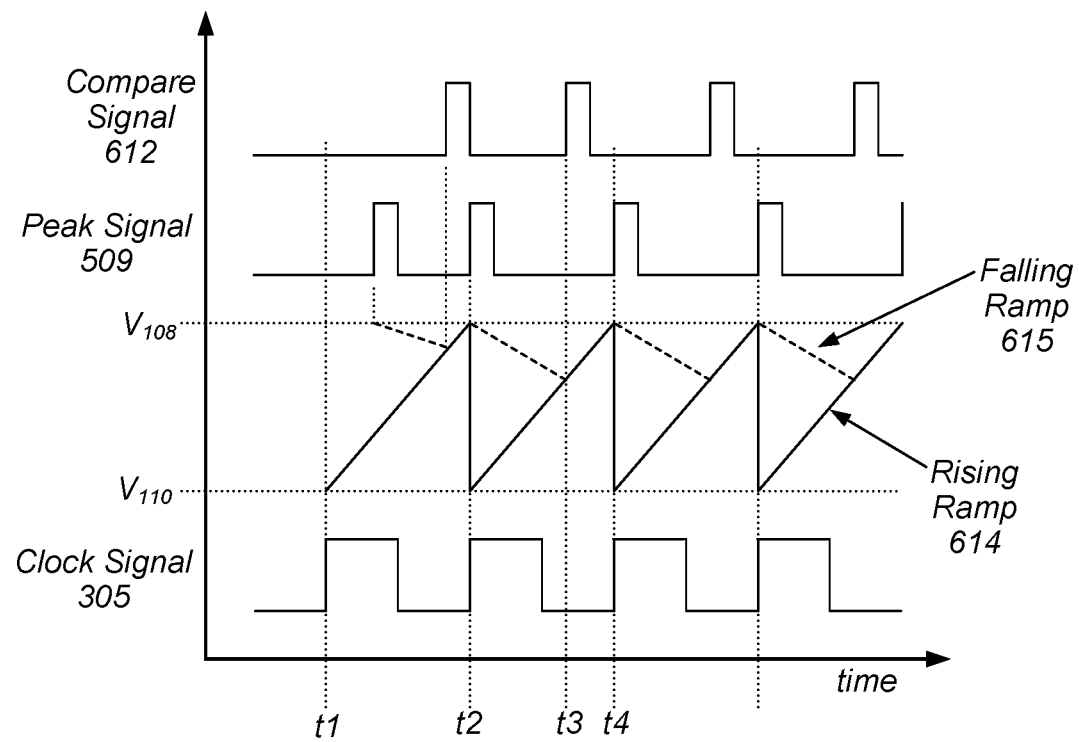
FIG. 13 illustrates example waveforms associated with a power converter circuit that is operating in a particular regulation mode.

Turning to FIG. 13, example waveforms associated with a power converter circuit operating in bottom-half regulation mode are depicted. It is noted that the waveforms depicted in FIG. 13 are merely an example and that, in other embodiments, relative timings and magnitudes of the various signals may be different.

At time t1, clock signal 305 is activated, and rising ramp 614 is initiated. It is noted that rising ramp 614 starts at a value corresponding to the voltage of terminal node 110 and continues to a value corresponding to the voltage of terminal node 108. Rising ramp 614 is started at each rising edge of clock signal 305 at times t2, t4, and so on.

Comparator circuit 502 activates peak signal 509 in response to the current through inductor 107 reaching the value of error signal 508. When peak signal 509 is activated, current is no longer sourced to inductor 107 and the current in inductor 107 begins to fall. At the same time, falling ramp 615 is activated and it begins to fall from the voltage level of terminal node 108.

As described above, comparator circuit 601 is configured to compare falling ramp 615 to rising ramp 614. At time t3, the values of falling ramp 615 and rising ramp 614 are the same, and comparator circuit 601 activates compare signal 612, which is used to deactivate fall-time signal 308, ending the period of time the current of inductor 107 is allowed to decrease.

Since the slopes of rising ramp 614 and falling ramp 615 are designed to match the slopes of the current flowing in inductor 107 as the current rises and falls, control circuit 101 can achieve lock within two clock cycles, thereby improving the performance of power converter circuit 100.

Figure 14:
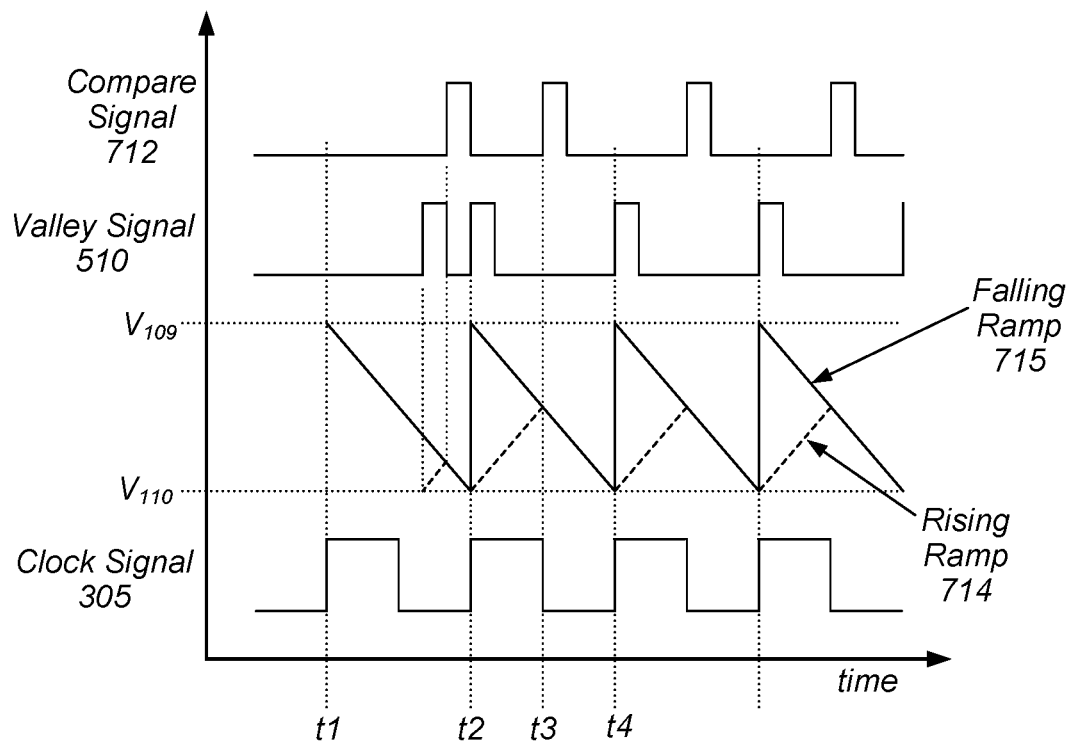
FIG. 14 illustrates example waveforms associated with a power converter circuit that is operating in a different regulation mode.

Turning to FIG. 14, example waveforms associated with a power converter circuit operating in top-half regulation mode are depicted. It is noted that the waveforms depicted in FIG. 14 are merely an example and that, in other embodiments, relative timings and magnitudes of the various signals may be different.

At time t1, clock signal 305 is activated, and falling ramp 715 is initiated. It is noted that falling ramp 715 starts at a value corresponding to the voltage of terminal node 109 and continues to a value corresponding to the voltage of terminal node 110. Falling ramp 715 is started at each rising edge of clock signal 305 at times t2, t4, and so on.

Comparator circuit 503 activates valley signal 510 in response to the current through inductor 107 reaching the value of error signal 508. When valley signal 510 is activated, current is sourced to inductor 107 and the current in inductor 107 begins to rise. At the same time, rising ramp 714 is activated and begins to increase from the voltage level of terminal node 110.

As described above, comparator circuit 701 is configured to compare falling ramp 715 to rising ramp 714. At time t3, the values of falling ramp 715 and rising ramp 714 are the same, and comparator circuit 701 activates compare signal 712, which is used to deactivate rise-time signal 309, ending the period of time the current of inductor 107 is allowed to increase.

Since the slopes of rising ramp 714 and falling ramp 715 are designed to match the slopes of the current flowing in inductor 107 as the current rises and falls, control circuit 101 can achieve lock within two clock cycles, thereby improving the performance of power converter circuit 100.

To summarize, various embodiments of a multi-level power converter circuit are disclosed. Broadly speaking, an apparatus is contemplated in which a switch circuit includes a capacitor and a plurality of switches, where a first subset of the plurality of switches are coupled between a first terminal node of a plurality of terminal nodes and a switch node coupled to second terminal node of the plurality of terminal nodes via an inductor, and where a second subset of the plurality of switches is coupled between the switch node and a third terminal node of the plurality of terminal nodes.

In some embodiments, a control circuit is configured to perform a comparison of the respective voltage levels of the first, second, and third terminal nodes, and select, using a result of the comparison, a particular regulation mode from a plurality of regulations modes and a particular switching sequence from a plurality of switching sequences. In various embodiments, the particular switching sequence includes a particular plurality of cycles. The control circuit can be further configured to adjust a duration of at least one cycle of the particular plurality of cycles using the respective voltage levels of the plurality of terminal nodes and a reference voltage.

In other embodiments, to perform the comparison, the control circuit can be configured to perform a first comparison of a second voltage level of a second terminal node of the plurality of terminal nodes to a third voltage level of a third terminal node of the plurality of terminal nodes, and perform a second comparison of a first voltage level of the first terminal node to the third voltage level of the third terminal node. The control circuit can also be configured to perform a third comparison of a first result of the first comparison and a second result of the second comparison, and select the particular regulation mode and the particular switching sequence using a third result of the third comparison.

Figure 15:
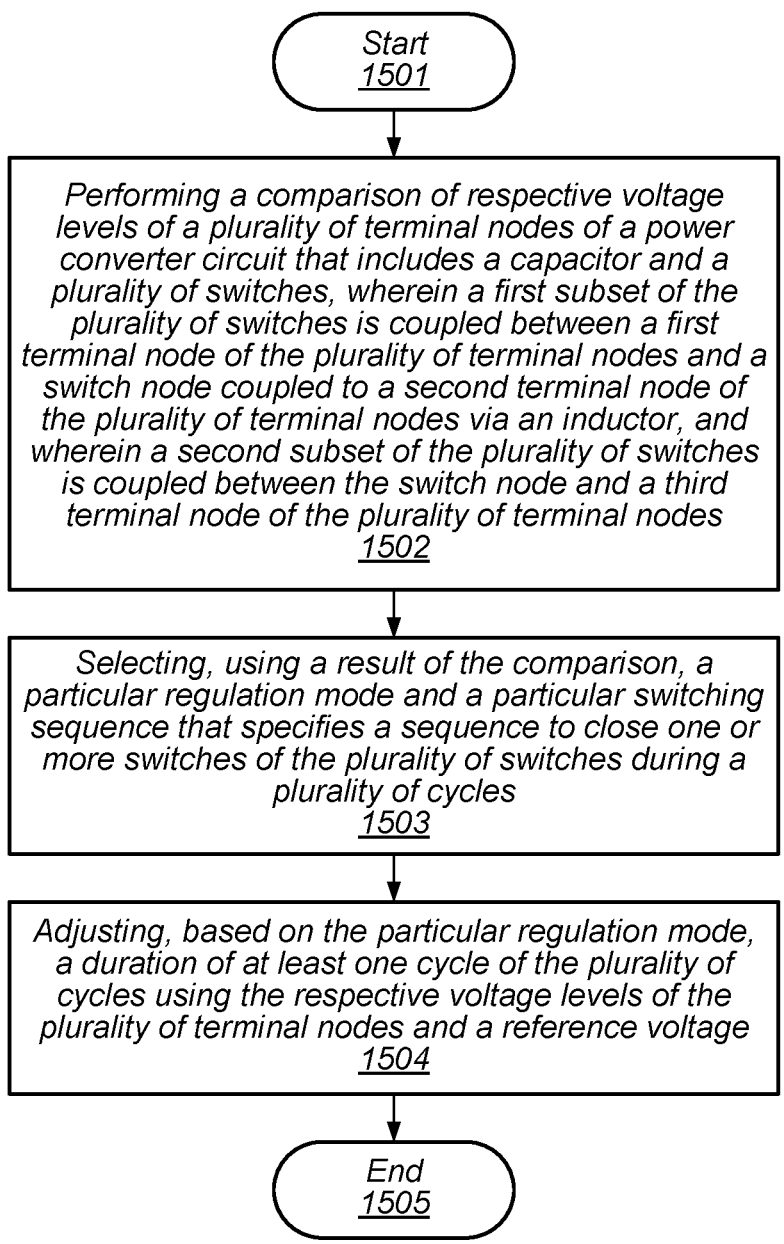
FIG. 15 is a flow diagram of an embodiment of a method for selecting a regulation mode for a power converter circuit.

Turning to FIG. 15, a flow diagram depicting an embodiment of a method for operating a power converter circuit is illustrated. The method, which may be applied to various power converter circuits including power converter circuit 100, begins in block 1501.

The method includes performing a comparison of respective voltage levels of a plurality of terminal nodes coupled to a power converter circuit that includes a capacitor and a plurality of switches, wherein a first subset of the plurality of switches is coupled between a first terminal node of a plurality of terminal nodes and a switch node coupled to a second terminal node of the plurality of terminal nodes via an inductor, and wherein a second subset of the plurality of switches is coupled between the switch node and a third terminal node of the plurality of terminal nodes (block 1502).

In some embodiments, performing the comparison of the respective voltage levels of the plurality of terminal nodes includes performing a first comparison of a second voltage level of a second terminal node of the plurality of terminal nodes to a third voltage level of a third terminal node of the plurality of terminal nodes, and performing a second comparison of a first voltage level of the first terminal node to the third voltage level of the third terminal node. The method may additionally include performing a third comparison of a first result of the first comparison and a second result of the second comparison, and selecting the particular regulation mode and the particular switching sequence using a third result of the third comparison.

The method further includes selecting, using a result of the comparison, a particular regulation mode and a particular switching sequence that specifies a sequence to close one or more switches of the plurality of switches during a plurality of cycles (block 1503).

The method also includes adjusting, based on the particular regulation mode, a duration of at least one cycle of the plurality of cycles using the respective voltage levels of the plurality of terminal nodes and a reference voltage (block 1504).

In some embodiments, the method may also include, in response to determining that half of a difference between the second voltage level and the third voltage level is less than a second difference between the first voltage level and the third voltage level, initiating a falling ramp signal in response to an activation of a clock signal. In various embodiments, an initial voltage of the falling ramp signal is the voltage level of the second terminal node. The method also may include performing a comparison of a peak target signal and current flowing in the inductor, initiating a rising ramp signal using a result of the comparison, and halting the at least one cycle in response to determining a first value of the rising ramp signal is the same as a second value of the falling ramp signal.

In various embodiments, the method may further include generating a feedback signal using a voltage level of at least one of the plurality of terminal nodes, performing a different comparison of the reference voltage and the feedback signal, and generating a peak target signal using a result of the different comparison. The method may additionally include charging a different capacitor using a voltage level of the second terminal node, and discharging the different capacitor using a discharge current whose value is proportional to a difference between the second voltage level and half of a difference between the first voltage level and the third voltage level.

In some embodiments, the method also includes charging a different capacitor with a charge current whose value is proportional to a difference between the first voltage level and the third voltage level. The method concludes in block 1505.

Figure 16:
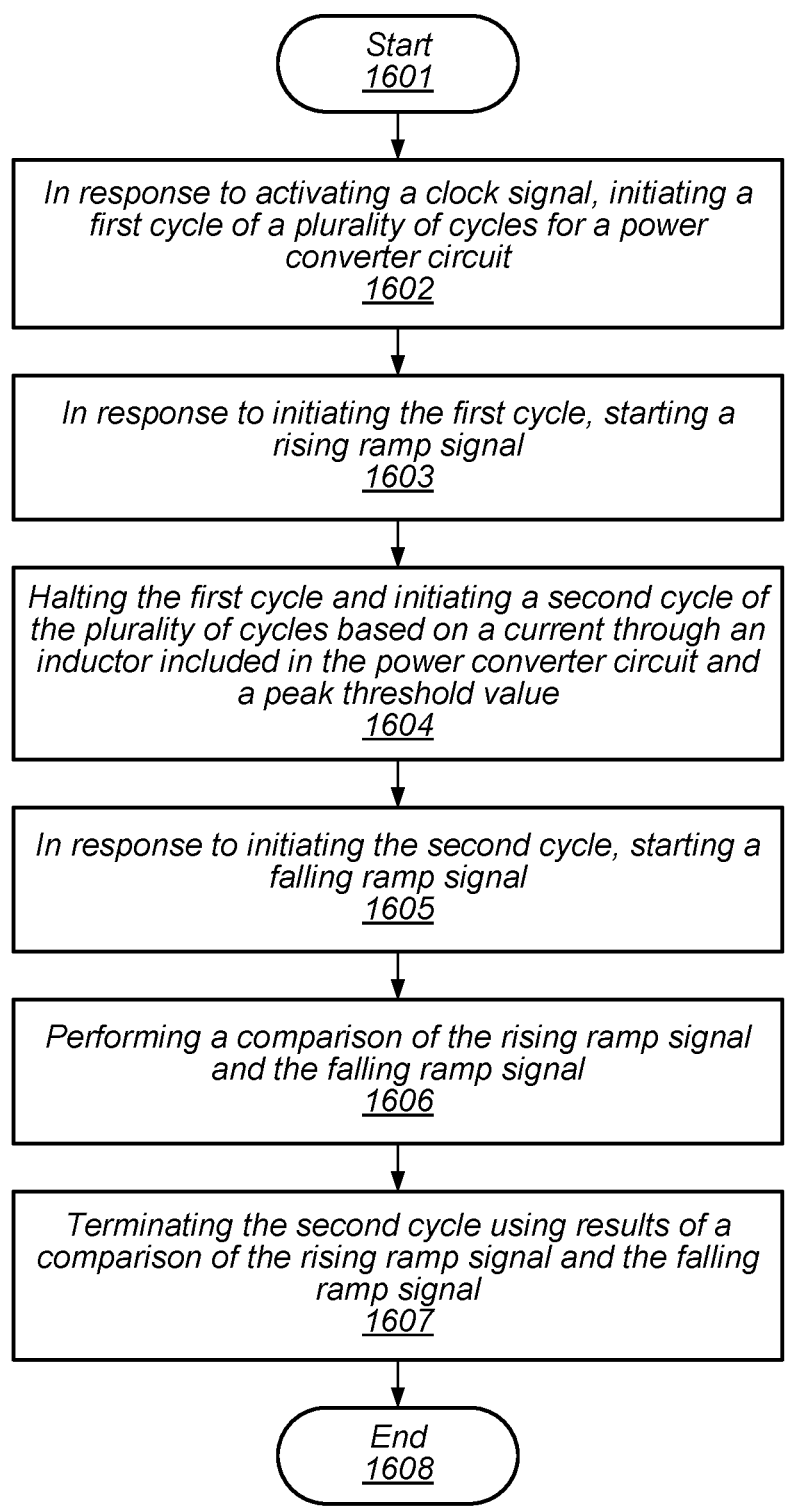
FIG. 16 is a flow diagram of an embodiment of a method for operating a power converter circuit in a particular regulation mode.

Turning to FIG. 16, a flow diagram depicting an embodiment of a method for operating a power converter circuit using a switching sequence for a first terminal node voltage condition is illustrated. The method, which may be included in block 1504 of the flow diagram of FIG. 15, begins in block 1601.

The method includes, in response to activating a clock signal, initiating a first cycle of a plurality of cycles for a power converter circuit (block 1602). As described above, the power converter circuit includes a capacitor, a plurality of switches, and an inductor, and initiating the first cycle may include closing a first subset of the plurality of switches to couple the inductor between the first terminal node and the second terminal node.

The method further includes, in response to initiating the first cycle, starting a rising ramp signal (block 1603). In various embodiments, starting the rising ramp signal includes generating a first current, and charging a capacitor using the first current.

The method also includes halting the first cycle and initiating a second cycle of the plurality of cycles based on a current through an inductor included in the power converter circuit and a peak threshold value (block 1604). In various embodiments, the method also includes halting the first cycle and initiating the second cycle in response to determining the current through the inductor exceeds the peak threshold value. In other embodiments, halting the first cycle and initiating the second cycle includes opening the first subset of the plurality of switches and closing a second subset of the plurality of switches to couple the inductor and the capacitor in series between the first terminal node and the second terminal node.

The method further includes, in response to initiating the second cycle, starting a falling ramp signal (block 1605). In various embodiments, starting the falling ramp signal includes generating a second current and discharging a previously charged capacitor using the second current.

The method also includes performing a comparison of the rising ramp signal and the falling ramp signal (block 1606). The method further includes terminating the second cycle using results of the comparison of the rising ramp signal and the falling ramp signal (block 1607). In various embodiments, the method also includes terminating the second cycle in response to determining that respective values of the rising ramp signal and the falling ramp signal are the same.

The method concludes in block 1608. It is noted that the method described in the flow diagram of FIG. 16 can be repeated. It is further noted that although only two cycles are described, in other embodiments, additional cycles may be employed and some cycles may be repeated.

Figure 17:
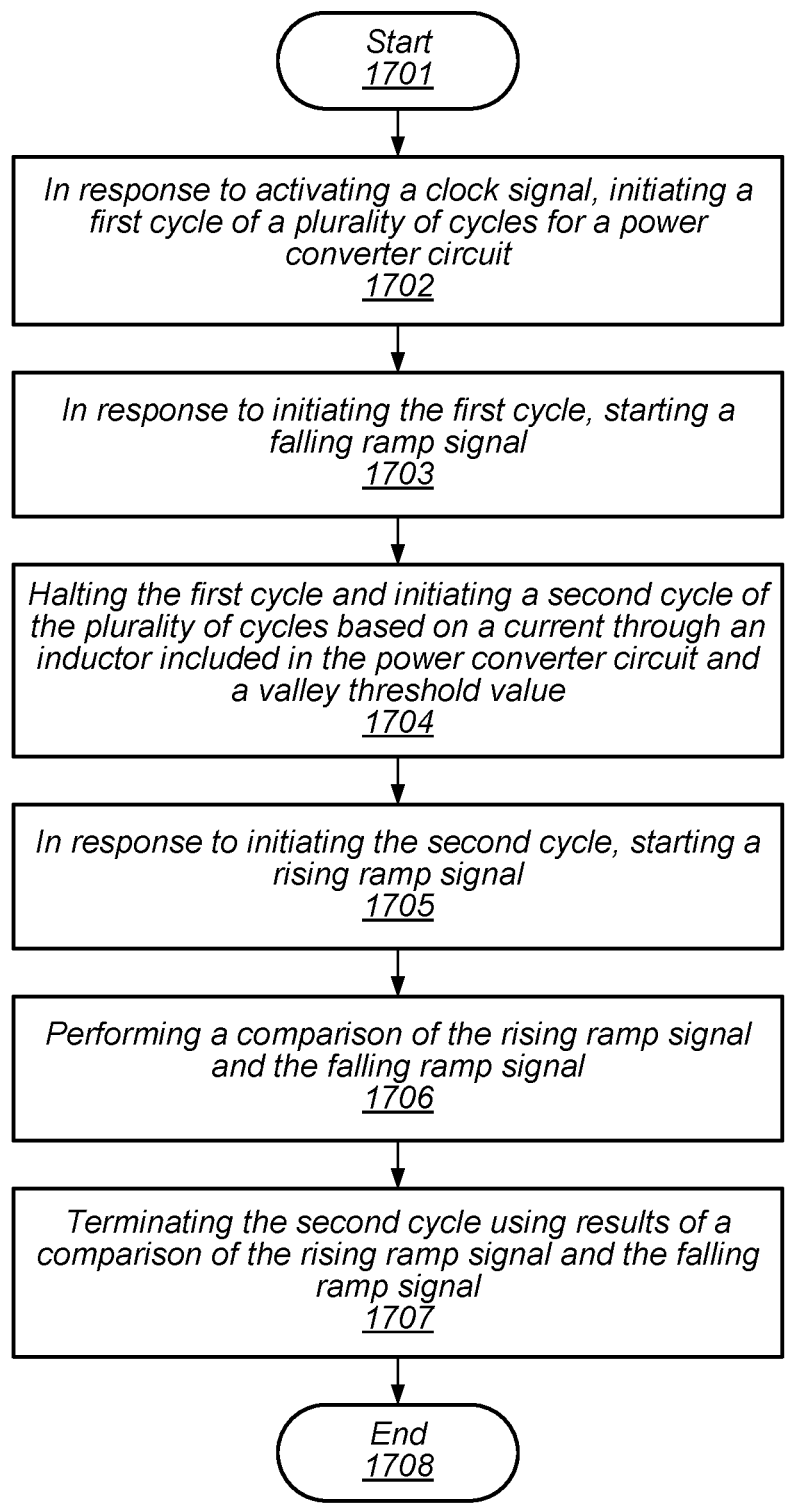
FIG. 17 is a flow diagram of an embodiment of a method for operating a power converter circuit in a different regulation mode.

Turning to FIG. 17, a flow diagram depicting an embodiment of a method for operating a power converter circuit using a switching sequence for the second terminal node voltage condition is illustrated. The method, which may be included in block 1504 of the flow diagram of FIG. 15, begins in block 1701.

The method includes, in response to activating a clock signal, initiating a first cycle of a plurality of cycles for a power converter circuit (block 1702). As described above, the power converter circuit includes a capacitor, a plurality of switches, and an inductor, and initiating the first cycle may include closing a first subset of the plurality of switches to couple the inductor between the second terminal node and the third terminal node.

The method further includes, in response to initiating the first cycle, starting a falling ramp signal (block 1703). In various embodiments, starting the falling ramp signal includes generating a first current, and discharging a previously charged capacitor using the first current.

The method also includes halting the first cycle and initiating a second cycle of the plurality of cycles based on a current through an inductor included in the power converter circuit and a valley threshold value (block 1704). In various embodiments, the method also includes halting the first cycle and initiating the second cycle in response to determining the current through the inductor exceeds the valley threshold value. In other embodiments, halting the first cycle and initiating the second cycle includes opening the first subset of the plurality of switches and closing a second subset of the plurality of switches to couple the inductor and the capacitor in series between the first terminal node and the second terminal node.

The method further includes, in response to initiating the second cycle, starting a rising ramp signal (block 1705). In various embodiments, starting the rising ramp signal includes generating a second current and charging a capacitor using the second current.

The method also includes performing a comparison of the rising ramp signal and the falling ramp signal (block 1706). The method further includes terminating the second cycle using results of the comparison of the rising ramp signal and the falling ramp signal (block 1707). In various embodiments, the method also includes terminating the second cycle in response to determining that respective values of the rising ramp signal and the falling ramp signal are the same.

The method concludes in block 1708. It is noted that the method described in the flow diagram of FIG. 17 can be repeated. It is further noted that although only two cycles are described, in other embodiments, additional cycles may be employed and some cycles may be repeated.

Figure 18:
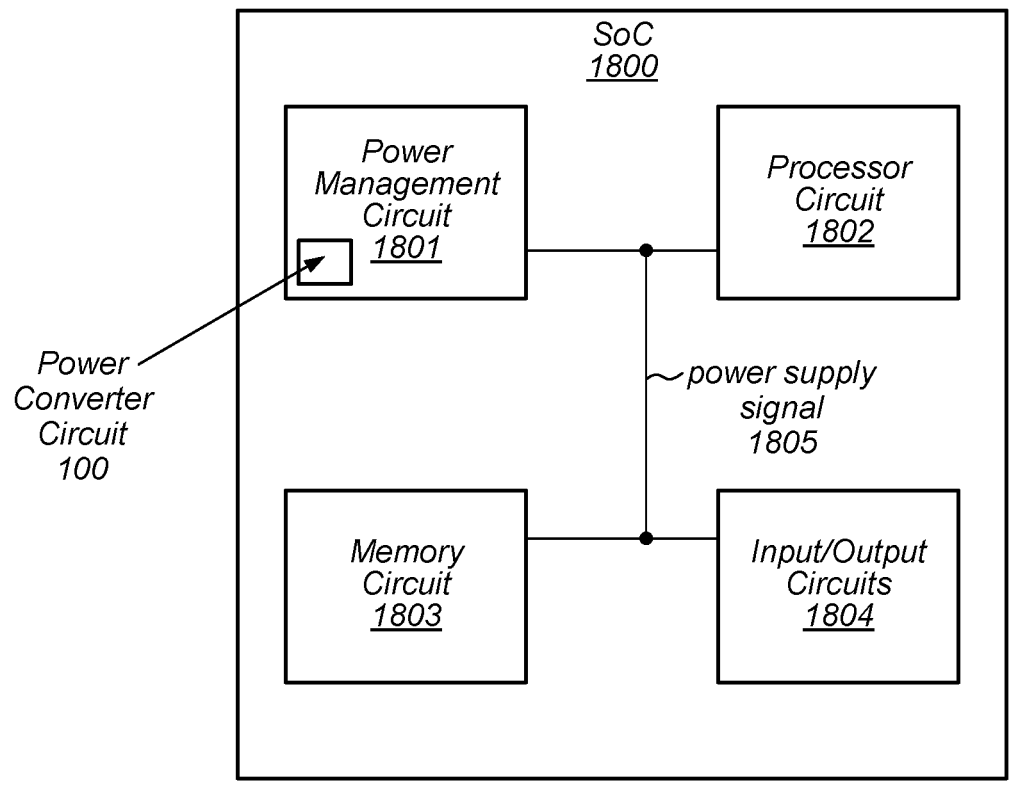
FIG. 18 is a block diagram of one embodiment of a system-on-a-chip that includes a power management circuit.

A block diagram of a system-on-a-chip (SoC) is illustrated in FIG. 18. In the illustrated embodiment, SoC 1800 includes power management circuit 1801, processor circuit 1802, input/output circuits 1804, and memory circuit 1803, each of which is coupled to power supply signal 1805. In various embodiments, SoC 1800 may be configured for use in a desktop computer, server, or in a mobile computing application such as, e.g., a tablet, laptop computer, or wearable computing device.

Power management circuit 1801 includes power converter circuit 100, which is configured to generate a regulated voltage level on power supply signal 1805 in order to provide power to processor circuit 1802, input/output circuits 1804, and memory circuit 1803. Although power management circuit 1801 is depicted as including a single power converter circuit, in other embodiments, any suitable number of power converter circuits may be included in power management circuit 1801, each configured to generate a regulated voltage level on a respective one of multiple internal power supply signals included in SoC 1800.

Processor circuit 1802 may, in various embodiments, be representative of a general-purpose processor that performs computational operations. For example, processor circuit 1802 may be a central processing unit (CPU) such as a microprocessor, a microcontroller, an application-specific integrated circuit (ASIC), or a field-programmable gate array (FPGA).

Memory circuit 1803 may, in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 18, in other embodiments, any suitable number of memory circuits may be employed.

Input/output circuits 1804 may be configured to coordinate data transfer between SoC 1800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1804 may be configured to implement a version of Universal Serial Bus (USB) protocol or IEEE 1394 (Firewire®) protocol.

Input/output circuits 1804 may also be configured to coordinate data transfer between SoC 1800 and one or more devices (e.g., other computing systems or integrated circuits) coupled to SoC 1800 via a network. In one embodiment, input/output circuits 1804 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1804 may be configured to implement multiple discrete network interface ports.

Figure 19:
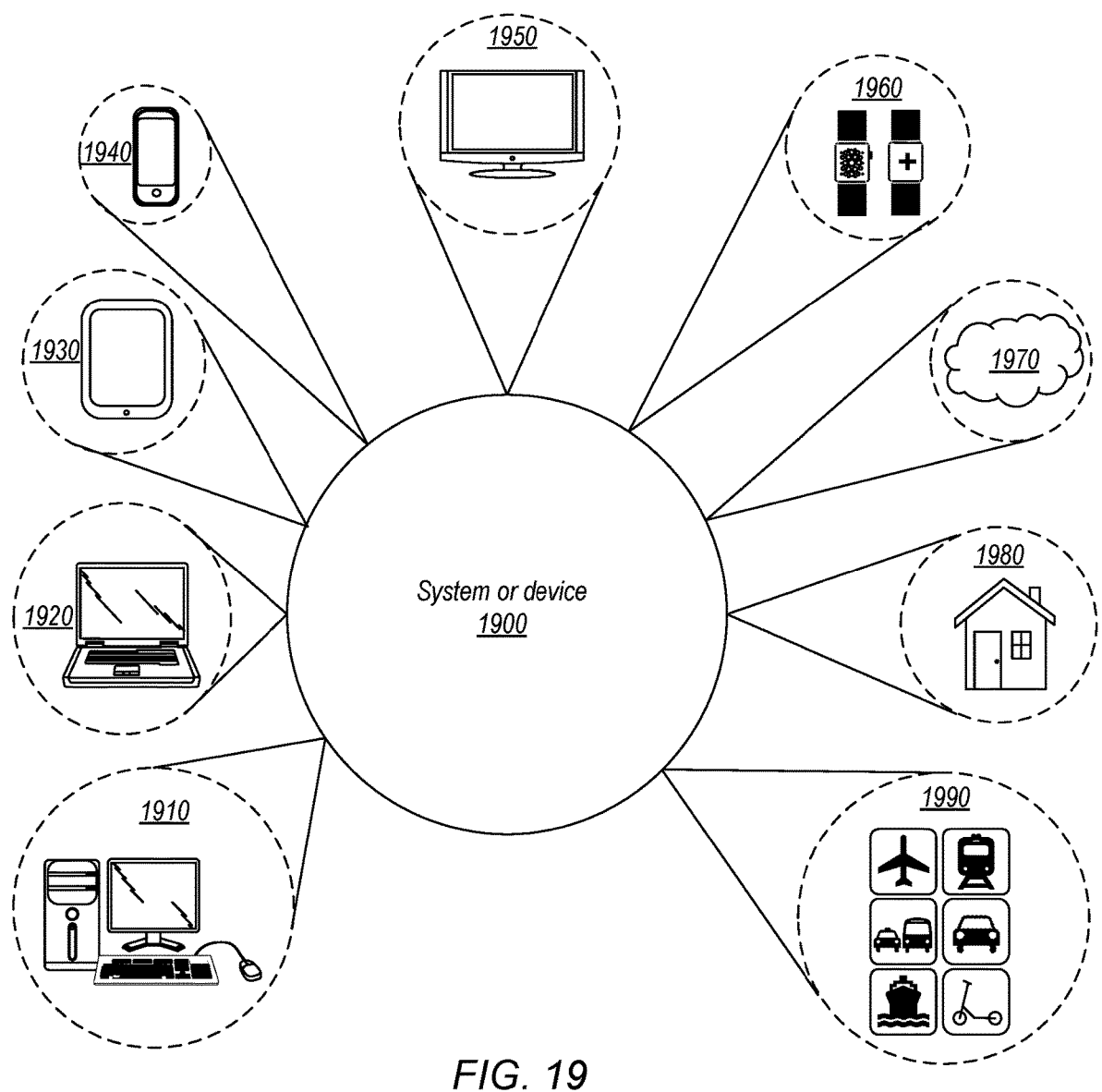
FIG. 19 is a block diagram of various embodiments of computer systems that may include power converter circuits.

Turning now to FIG. 19, various types of systems that may include any of the circuits, devices, or systems discussed above are illustrated. System or device 1900, which may incorporate or otherwise utilize one or more of the techniques described herein, may be utilized in a wide range of areas. For example, system or device 1900 may be utilized as part of the hardware of systems such as a desktop computer 1910, laptop computer 1920, tablet computer 1930, cellular or mobile phone 1940, or television 1950 (or set-top box coupled to a television).

Similarly, disclosed elements may be utilized in a wearable device 1960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1900 may also be used in various other contexts. For example, system or device 1900 may be utilized in the context of a server computer system, such as a dedicated server or on shared hardware that implements a cloud-based service 1970. Still further, system or device 1900 may be implemented in a wide range of specialized everyday devices, including devices 1980 commonly found in the home such as refrigerators, thermostats, security cameras, etc. The interconnection of such devices is often referred to as the "Internet of Things" (IoT). Elements may also be implemented in various modes of transportation. For example, system or device 1900 could be employed in the control systems, guidance systems, entertainment systems, etc. of various types of vehicles 1990.

The applications illustrated in FIG. 19 are merely exemplary and are not intended to limit the potential future applications of disclosed systems or devices. Other example applications include, without limitation: portable gaming devices, music players, data storage devices, unmanned aerial vehicles, etc.

Figure 20:
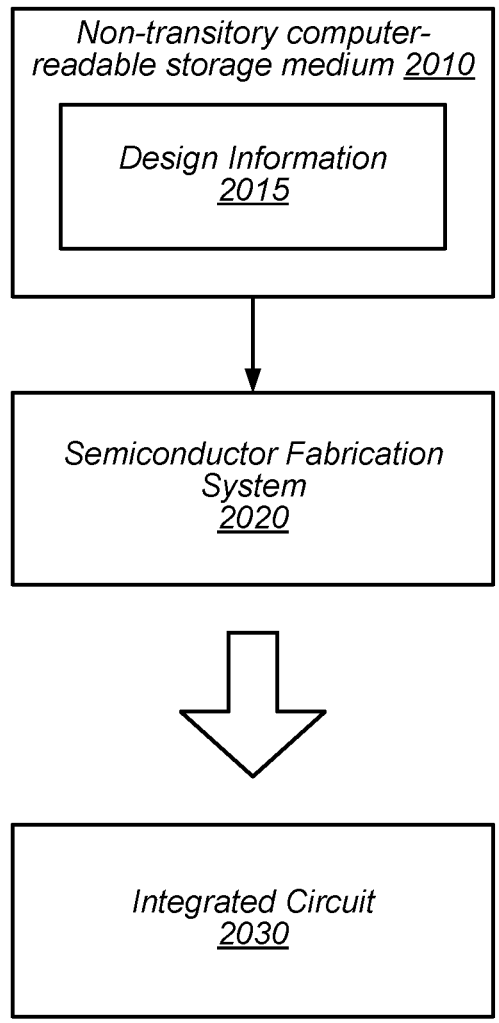
FIG. 20 illustrates an example of a non-transitory computer-readable storage medium that stores circuit design information.

FIG. 20 is a block diagram illustrating an example of a non-transitory computer-readable storage medium that stores circuit design information, according to some embodiments. In the illustrated embodiment, semiconductor fabrication system 2020 is configured to process design information 2015 stored on non-transitory computer-readable storage medium 2010 and fabricate integrated circuit 2030 based on design information 2015.

Non-transitory computer-readable storage medium 2010 may comprise any of various appropriate types of memory devices or storage devices. Non-transitory computer-readable storage medium 2010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 2010 may include other types of non-transitory memory as well or combinations thereof. Non-transitory computer-readable storage medium 2010 may include two or more memory mediums, which may reside in different locations, e.g., in different computer systems that are connected over a network.

Design information 2015 may be specified using any of various appropriate computer languages, including hardware description languages such as, without limitation: VHDL, Verilog, SystemC, SystemVerilog, RHDL, M, MyHDL, etc. Design information 2015 may be usable by semiconductor fabrication system 2020 to fabricate at least a portion of integrated circuit 2030. The format of design information 2015 may be recognized by at least one semiconductor fabrication system, such as semiconductor fabrication system 2020, for example. In some embodiments, design information 2015 may include a netlist that specifies elements of a cell library, as well as their connectivity. One or more cell libraries used during logic synthesis of circuits included in integrated circuit 2030 may also be included in design information 2015. Such cell libraries may include information indicative of device or transistor-level netlists, mask design data, characterization data, and the like, of cells included in the cell library.

Integrated circuit 2030 may, in various embodiments, include one or more custom macrocells, such as memories, analog or mixed-signal circuits, and the like. In such cases, design information 2015 may include information related to included macrocells. Such information may include, without limitation, schematics capture database, mask design data, behavioral models, and device or transistor-level netlists. As used herein, mask design data may be formatted according to graphic data system (GDSII), or any other suitable format.

Semiconductor fabrication system 2020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2020 may also be configured to perform various testing of fabricated circuits for correct operation.

In various embodiments, integrated circuit 2030 is configured to operate according to a circuit design specified by design information 2015, which may include performing any of the functionality described herein. For example, integrated circuit 2030 may include any of various elements shown or described herein. Further, integrated circuit 2030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y.

On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third," when applied to a particular feature, do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a switch circuit including a switch node coupled to an inductor, wherein the switch circuit is coupled to a first terminal node, a second terminal node via the inductor, and a third terminal node, wherein the switch circuit includes a capacitor and a plurality of switches, and wherein the switch circuit is configured to source, using respective voltage levels of the first, second, and third terminal nodes, a current to the inductor during a particular cycle of a plurality of cycles included in a selected regulation mode; and
   a control circuit configured to:
   perform a comparison of the respective voltage levels of the first, second, and third terminal nodes;
   select, using a result of the comparison, a particular regulation mode from a plurality of regulation modes and a particular switching sequence of a plurality of switching sequences, wherein the particular switching sequence includes a particular plurality of cycles; and
   adjust a duration of at least one cycle of the particular plurality of cycles using the respective voltage levels of the first, second, and third terminal nodes and a reference voltage.

2. The apparatus of claim 1, wherein to perform the comparison, the control circuit is further configured to:
   perform a first comparison of a second voltage level of the second terminal node to a third voltage level of the third terminal node;
   perform a second comparison of a first voltage level of the first terminal node to the third voltage level of the third terminal node;
   perform a third comparison of a first result of the first comparison and a second result of the second comparison; and
   select the particular regulation mode and the particular switching sequence using a third result of the third comparison.

3. The apparatus of claim 2, wherein the control circuit is further configured, in response to determining that half of a difference between the second voltage level and the third voltage level is greater than a second difference between the first voltage level and the third voltage level, to:
   couple, during a first cycle of the plurality of cycles, the switch node to the third terminal node;
   couple, during a second cycle of the plurality of cycles, the inductor and the capacitor in series between the first terminal node and the second terminal node; and
   couple, during a third cycle of the plurality of cycles, the inductor and the capacitor in series between the first terminal node and the third terminal node.

4. The apparatus of claim 2, wherein to adjust the duration of the at least one cycle, the control circuit is further configured to:

initiate a falling ramp signal in response to an activation of a clock signal, wherein an initial voltage of the falling ramp signal is the second voltage level;

perform a comparison of a valley target signal and a sensed current flowing in the inductor;

initiate a rising ramp signal using a result of the comparison; and halt the at least one cycle in response to a determination that a first value of the rising ramp signal is the same as a second value of the falling ramp signal.

5. The apparatus of claim 4, wherein the control circuit is further configured to:

generate a feedback signal using a voltage level of at least one of the first, second, or third terminal nodes;

perform a different comparison of the reference voltage and the feedback signal; and generate the valley target signal using a result of the different comparison.

6. The apparatus of claim 4, wherein the control circuit is further configured to charge a different capacitor with a charge current whose value is proportional to a difference between the first voltage level and the third voltage level.

7. A method, comprising:

performing a comparison of respective voltage levels of a plurality of terminal nodes coupled to a power converter circuit that includes a capacitor and a plurality of switches, wherein a first subset of the plurality of switches are coupled between a first terminal node of the plurality of terminal nodes and a switch node coupled to second terminal node of the plurality of terminal nodes via an inductor, and wherein a second subset of the plurality of switches is coupled between the switch node and a third terminal node of the plurality of terminal nodes;

selecting, using a result of the comparison, a particular regulation mode and a particular switching sequence that specifies a sequence to close one or more switches of the plurality of switches during a plurality of cycles; and adjusting, based on the particular regulation mode, a duration of at least one cycle of the plurality of cycles using the respective voltage levels of the plurality of terminal nodes and a reference voltage.

8. The method of claim 7, wherein performing the comparison includes:

performing a first comparison of a second voltage level of a second terminal node of the plurality of terminal nodes to a third voltage level of the third terminal node of the plurality of terminal nodes;

performing a second comparison of a first voltage level of the first terminal node to the third voltage level of the third terminal node;

performing a third comparison of a first result of the first comparison and a second result of the second comparison; and selecting the particular regulation mode and the particular switching sequence using a third result of the third comparison.

9. The method of claim 8, further comprising, in response to determining that half of a difference between the second voltage level and the third voltage level is less than a second difference between the first voltage level and the third voltage level:

coupling, during a first cycle of the plurality of cycles, the switch node to the second terminal node;

coupling, during a second cycle of the plurality of cycles, the inductor and the capacitor in series between the first terminal node and the second terminal node; and coupling, during a third cycle of the plurality of cycles, the inductor and the capacitor in series between the first terminal node and the third terminal node.

10. The method of claim 8, further comprising, in response to determining that half of a difference between the second voltage level and the third voltage level is less than a second difference between the first voltage level and the third voltage level:

initiating a falling ramp signal in response to an activation of a clock signal, wherein an initial voltage of the falling ramp signal is the second voltage level;

performing a comparison of a peak target signal and a current flowing in the inductor;

initiating a rising ramp signal using a result of the comparison; and halting the at least one cycle in response to determining that a first value of the rising ramp signal is the same as a second value of the falling ramp signal.

11. The method of claim 10, further comprising:

generating a feedback signal using a voltage level of at least one of the plurality of terminal nodes;

performing a different comparison of the reference voltage and the feedback signal; and generating the peak target signal using a result of the different comparison.

12. The method of claim 10, further comprising:

charging a different capacitor using a voltage level of the second terminal node; and discharging the different capacitor using a discharge current whose value is proportional to a difference between the second voltage level and half of a difference between the first voltage level and the third voltage level.

13. The method of claim 10, further comprising charging a different capacitor with a charge current whose value is proportional to a difference between the first voltage level and the third voltage level.

14. An apparatus, comprising:

a functional circuit block coupled to a regulated power supply node; and a power converter circuit that includes a capacitor and a plurality of switches, wherein a first subset of the plurality of switches are coupled between a first terminal node of a plurality of terminal nodes and a switch node coupled to a second terminal node of the plurality of terminal nodes via an inductor, and wherein a second subset of the plurality of switches is coupled between the switch node and a third terminal node of the plurality of terminal nodes, wherein the power converter circuit is configured to:

perform a comparison of respective voltage levels of the plurality of terminal nodes coupled to the power converter circuit;

select, using a result of the comparison, a particular regulation mode and a particular switching sequence that specifies a sequence to close one or more switches of the plurality of switches during a plurality of cycles; and adjust, based on the particular regulation mode, a duration of at least one cycle of the plurality of cycles using the respective voltage levels of the plurality of terminal nodes and a reference voltage.

15. The apparatus of claim 14, wherein to perform the comparison, the power converter circuit is further configured to:
perform a first comparison of a second voltage level of the second terminal node of the plurality of terminal nodes to a third voltage level of the third terminal node of the plurality of terminal nodes;
perform a second comparison of a first voltage level of the first terminal node to the third voltage level of the third terminal node;
perform a third comparison of a first result of the first comparison and a second result of the second comparison; and
select the particular regulation mode and the particular switching sequence using a third result of the third comparison.

16. The apparatus of claim 15, wherein the power converter circuit is further configured, in response to a determination that half of a difference between the second voltage level and the third voltage level is less than a second difference between the first voltage level and the third voltage level, to:
couple, during a first cycle of the plurality of cycles, the switch node to the second terminal node;
couple, during a second cycle of the plurality of cycles, the inductor and the capacitor in series between the first terminal node and the second terminal node; and
couple, during a third cycle of the plurality of cycles, the inductor and the capacitor in series between the first terminal node and the third terminal node.

17. The apparatus of claim 16, wherein to adjust the duration of the at least one cycle, the power converter circuit is further configured to:
initiate a falling ramp signal in response to an activation of a clock signal, wherein an initial voltage of the falling ramp signal is the second voltage level;
perform a comparison of a peak target signal and a current flowing in the inductor;
initiate a rising ramp signal using a result of the comparison; and
halt the at least one cycle in response to a determination that a first value of the rising ramp signal is the same as a second value of the falling ramp signal.

18. The apparatus of claim 17, wherein the power converter circuit is further configured to:
generate a feedback signal using a voltage level of at least one of the plurality of terminal nodes;
perform a different comparison of the reference voltage and the feedback signal; and
generate the peak target signal using a result of the different comparison.

19. The apparatus of claim 17, wherein the power converter circuit is further configured to charge a different capacitor with a charge current whose value is proportional to a difference between the first voltage level of the first terminal node and the third voltage level of the third terminal node.

20. The apparatus of claim 17, wherein the power converter circuit is further configured to charge a different capacitor using the second voltage level and discharge the different capacitor using a discharge current whose value is proportional to a difference between the second voltage level and half of a difference between the first voltage level and the third voltage level.

* * * * *